US007305240B2

(12) United States Patent
Chou et al.

(10) Patent No.: US 7,305,240 B2
(45) Date of Patent: Dec. 4, 2007

(54) METHOD AND SYSTEM OF NETWORK MANAGEMENT SOFTWARE ARCHITECTURES FOR MOBILE BROADBAND WIRELESS NETWORKS

(75) Inventors: Joey Chou, Scottsdale, AZ (US); Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 11/051,000

(22) Filed: Feb. 3, 2005

(65) Prior Publication Data

US 2006/0172742 A1  Aug. 3, 2006

(51) Int. Cl.
*H04Q 7/20* (2006.01)
(52) U.S. Cl. ............. 455/450; 455/435.1; 455/422.1; 370/401; 370/412; 370/428
(58) Field of Classification Search ............. 455/450, 455/435, 422; 709/223, 226; 725/68; 370/401, 370/412, 428
See application file for complete search history.

(56) References Cited

U.S. PATENT DOCUMENTS

| 5,913,037 | A  | * | 6/1999 | Spofford et al. ........... 709/226 |
| 2005/0055720 | A1 | * | 3/2005 | Atad et al. .................. 725/68 |
| 2005/0262229 | A1 | * | 11/2005 | Gattu et al. ................ 709/223 |

FOREIGN PATENT DOCUMENTS

EP  1 389 850 A1  2/2004

WO  WO 02/30057 A  4/2002
WO  WO 2006/023249 A1  3/2006

OTHER PUBLICATIONS

Kozierok, C.M., "TCP/IP Simple Network Management Protocol (SNMP) Protocol", The TCP/IP Guide—Version 2.0, 2001-2004, pp. 1239-1278.
"Part 16: Air Interface for Fixed Broadband Wireless Access Systems", IEEE, IEEE Standard for Local and Metropolitan Area Networks, 2002, pp. 1-128, 274-322.

(Continued)

*Primary Examiner*—Joseph Feild
*Assistant Examiner*—Michael Vu
(74) *Attorney, Agent, or Firm*—Blakely, Sokoloff, Taylor & Zafman LLP

(57) ABSTRACT

Method and system of network management and protocol software architectures for mobile broadband wireless networks. One embodiment of the software architecture employs a proxy Simple Network Management Protocol (SNMP) agent at a base station in the network. The proxy SNMP agent communicates with an SNMP manager at a network management system (NMS) using SNMP messages to send Management Information Base (MIB) objects between the NMS and the base station. The proxy SNMP agent communicates with a mobile subscriber station (MSS) using media access control (MAC) messages. The protocol software architecture further includes a management plane service access point (SAP) and a control plane SAP deployed in the MSS. The architecture enables specific parameters corresponding to dynamic service flows and Quality of Service to be retrieved from and written to an MSS using proxy SNMP agents at the base stations.

20 Claims, 18 Drawing Sheets

OTHER PUBLICATIONS

Yanover, V., "Re: [STDS-802-16] Comment 332," May 5, 2004, pp. 1-4. Retrieved from URL:http://www.ieee802.org/16/arc/802-16list2/msg01480.html (Retrieved on Jul. 19, 2006).

Stanwood, K., "Re: [STDS-802-16] Comment 332," May 4, 2004, pp. 1-2. Retrieved from URL:http://www.ieee802.org/16/arc/802-16list2/msg01471.html (Retrieved on Jul. 19, 2004).

Chou, Joey, "Mobile MIB," IEEE 802.16 Broadband Wireless Access Working Group, Sep. 12, 2005, pp. 1-19.

Eklund, C. et al., "IEEE Standard 802.16: A Technical Overview of the Wireless MAN™ Air Interface for Broadband Wireless Access," IEEE Communications Magazine, No. 6, Jun. 2002, pp. 98-107.

Levi, D. et al., "SNMPv3 Applications; rfc2273.txt," IETF Standard, Internet Engineering Task Force, Jan. 1998, pp. 1-70.

PCT/US2006/003443, PCT International Search Report and Written Opinion of the International Searching Authority, Aug. 30, 2006.

* cited by examiner

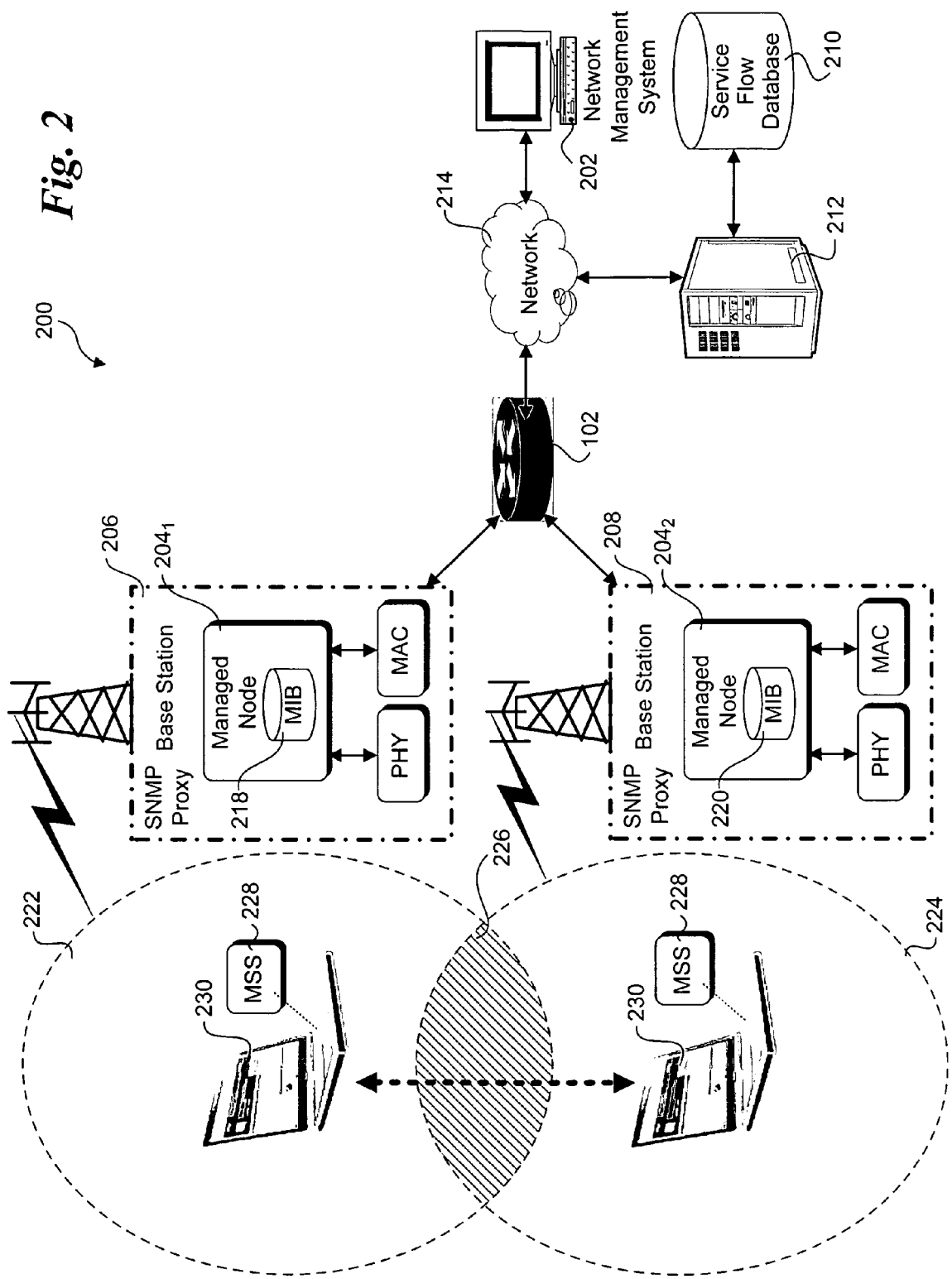

```
wmanIfBsPacketCs (1.3.6.1.2.1.10.184.1.1)
    ├─ wmanIfBsProvisionedSfTable
    ├─ wmanIfBsSsProvisionedForSfTable
    ├─ wmanIfBsServiceClassTable
    ├─ wmanIfBsClassifierRuleTable
    └─ wmanIfBsSsPacketCounterTable wmanIfBsCps (1.3.6.1.2.1.10.184.1.2)
    ├─ wmanIfBsRegisteredSsTable
    ├─ wmanIfBsConfiguration
    │       ├─ wmanIfBsConfigurationTable
    │       └─ wmanIfBsConfigExtTable
    ├─ wmanIfBsStatistcisCounter
    │       ├─ wmanIfBsChannelMeasurementTable
    │       └─ wmanIfBsSsFecCounterTable
    ├─ wmanIfBsCapabilities
    │       ├─ wmanIfBsSsReqCapabilitiesTable
    │       ├─ wmanIfBsSsRspCapabilitiesTable
    │       ├─ wmanIfBsBasicCapabilitiesTable
    │       └─ wmanIfBsCapabilitiesConfigTable
    └─ wmanIfBsSsActionsTable wmanIfBsPkmObjects (1.3.6.1.2.1.10.184.1.3)
    ├─ wmanIfBsPkmBaseTable
    ├─ wmanIfBsPkmAuthTable
    └─ wmanIfBsPkmTekTable wmanIfBsNotification (1.3.6.1.2.1.10.184.1.4)
    ├─ wmanIfBsTrapControl
    │       ├─ wmanIfBsTrapControlRegister
    │       └─ wmanIfBsThresholdConfigTable
    └─ wmanIfBsTrapDefinitions
            ├─ wmanIfBsSsNotificationObjectsTable
            ├─ wmanIfBsSsStatusNotificationTrap
            ├─ wmanIfBsSsDynamicServiceFailTrap
            ├─ wmanIfBsSsRssiStatusChangeTrap
            ├─ wmanIfBsSsPkmFailFailTrap
            ├─ wmanIfBsSsRegistrerTrap
            ├─ wmanIfBsNotificationObjectsTable
            ├─ wmanIfBsPowerStatusChangeTrap
            ├─ wmanIfBsFanStatusTrap
            ├─ wmanIfBsTemperatureChangeTrap
            └─ wmanIfBsEventTrap wmanIfBsEventLog (1.3.6.1.2.1.10.184.1.5)
        ├─ wmanIfBsEventLogEntryLimit
        ├─ wmanIfBsEventLifeTimeLimit
        ├─ wmanIfBsEventLogSeverityThreshold
        ├─ wmanIfBsEventLogWrapAroundBuffEnable
        ├─ wmanIfBsEventLogLatestEvent
        ├─ wmanIfBsEventTable
        └─ wmanIfBsEventLogTable
```

*Fig. 4b*

```
wmanIfBsPhy   (1.3.6.1.2.1.10.184.1.6)
       ├─ wmanIfBsOfdmPhy
       │              ├─ wmanIfBsOfdmUplinkChannelTable
       │              ├─ wmanIfBsOfdmDownlinkChannelTable
       │              ├─ wmanIfBsOfdmUcdBurstProfileTable
       │              ├─ wmanIfBsOfdmDcdBurstProfileTable
       │              ├─ wmanIfBsOfdmConfigurationTable
       │              ├─ wmanIfBsSsReqOfdmCapabilitiesTable
       │              ├─ wmanIfBsSsRspOfdmCapabilitiesTable
       │              ├─ wmanIfBsOfdmCapabilitiesTable
       │              └─ wmanIfBsOfdmCapabilitiesConfigTable
       └─ wmanIfBsOfdmaPhy
                      ├─ wmanIfBsOfdmaUplinkChannelTable
                      ├─ wmanIfBsOfdmaDownlinkChannelTable
                      ├─ wmanIfBsOfdmaUcdBurstProfileTable
                      └─ wmanIfBsOfdmaDcdBurstProfileTable wmanIfBsSnmpAgent  (1.3.6.1.2.1.10.184.1.7)
       └─ wmanIfBsSnmpAgentConfigTable
```

*Fig. 4c*

```
wmanIfCmnPacketCs  (1.3.6.1.2.1.10.184.3.1)
       ├─ wmanIfCmnClassifierRuleTable
       └─ wmanIfCmnPhsRuleTable wmanIfCmnCps       (1.3.6.1.2.1.10.184.3.2)
       ├─ wmanIfCmnCpsServiceFlowTable
       └─ wmanIfCmnBsSsConfigurationTable wmanIfCmnPkmObjects(1.3.6.1.2.1.10.184.3.3)
       └─ wmanIfCmnCryptoSuiteTable
```

*Fig. 4d*

```
wmanIfSsCps  (1.3.6.1.2.1.10.184.2.1)
    ├── wmanIfSsConfigFileEncodingTable
    ├── wmanIfSsConfigurationTable
    └── wmanIfSsStatisticCounter
             ├── wmanIfSsFecCounterTable
             └── wmanIfSsChannelMeasurementTable wmanIFSsPkmObjects  (1.3.6.1.2.1.10.184.2.2)
    ├── wmanIfSsPkmBaseTable
    ├── wmanIfSsPkmAuthTable
    ├── wmanIfSsPkmTekTable
    └── wmanIfSsDeviceCertTable wmanIfSsNotification  (1.3.6.1.2.1.10.184.2.3)
    ├── wmanIfSsTrapControl
    │        ├── wmanIfSsTrapControlRegister
    │        └── wmanIfSsThresholdConfigTable
    └── wmanIfBsTrapDefinitions
             ├── wmanIfSsTlvUnknownTrap
             ├── wmanIfSsDynamicServiceFailTrap
             ├── wmanIfSsDhcpSuccessTrap
             ├── wmanIfSsRssiStatusChangeTrap
             ├── wmanIfSsEventTrap
             └── wmanIfSsNotificationObjectsTable wmanIfSsEventLog  (1.3.6.1.2.1.10.184.2.4)
          ├── wmanIfSsEventLogEntryLimit
          ├── wmanIfSsEventLifeTimeLimit
          ├── wmanIfSsEventLogSeverityThreshold
          ├── wmanIfSsEventLogWrapAroundBuffEnable
          ├── wmanIfSsEventLogLatestEvent
          ├── wmanIfSsEventTable
          └── wmanIfSsEventLogTable wmanIfSsPhy  (1.3.6.1.2.1.10.184.2.5)
     ├── wmanIfSsOfdmPhy
     │        ├── wmanIfSsOfdmUplinkChannelTable
     │        ├── wmanIfSsOfdmDownlinkChannelTable
     │        ├── wmanIfSsOfdmUcdBurstProfileTable
     │        └── wmanIfSsOfdmDcdBurstProfileTable
     └── wmanIfSsOfdmaPhy
              ├── wmanIfSsOfdmaUplinkChannelTable
              ├── wmanIfSsOfdmaDownlinkChannelTable
              ├── wmanIfSsOfdmaUcdBurstProfileTable
              └── wmanIfSsOfdmaDcdBurstProfileTable
```

*Fig. 4e*

| Syntax | Size | Notes |
|---|---|---|
| TLV_Request_Message_Format( ){ | | |
| Management Message Type = xx | 8 bits | |
| Num_of_TLV | 8 bits | Number of TLVs |
| For (I = 0 ; I < Num_of_TLV ; i++) { | | |
| Requested TLV (Tag, Length, Value) | Variable | |
| } | | |
| } | | |

*Fig. 6a*

| Syntax | Size | Notes |
|---|---|---|
| TLV_Response_Message_Format( ){ | | |
| Management Message Type = xx | 8 bits | |
| Num_of_TLV | 8 bits | Number of TLVs |
| For (I = 0 ; I < Num_of_TLV ; i++) { | | |
| Response TLV (Tag, Length, Value) | Variable | |
| } | | |
| } | | |

*Fig. 6b*

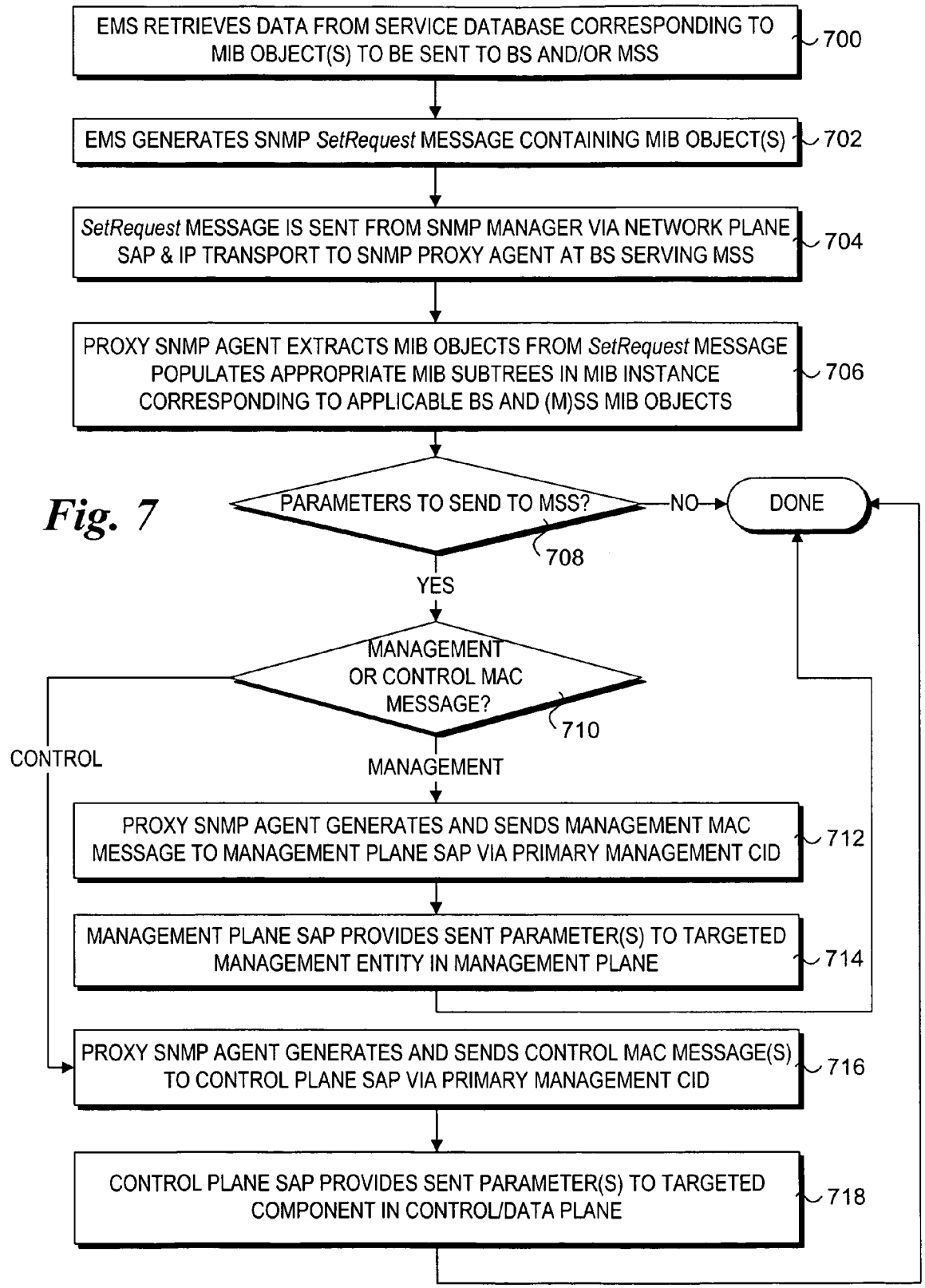

METHOD AND SYSTEM OF NETWORK MANAGEMENT SOFTWARE ARCHITECTURES FOR MOBILE BROADBAND WIRELESS NETWORKS

FIELD OF THE INVENTION

The field of invention relates generally to wireless communication networks and, more specifically but not exclusively relates to a method and system of network management software architectures for mobile broadband wireless networks.

BACKGROUND INFORMATION

IEEE (Institute of Electrical and Electronic Engineers) 802.16 is an emerging suite of air interface standards for combined fixed, portable and Mobile Broadband Wireless Access (MBWA). Initially conceived as a radio standard to enable cost-effective last-mile broadband connectivity to those not served by wired broadband such as cable or DSL, the specifications are evolving to target a broader market opportunity for mobile, high-speed broadband applications. The IEEE 802.16 architecture not only addresses the traditional "last mile" problem, but also supports nomadic and mobile clients on the go. The MBWA architecture is being standardized by the Worldwide Interoperability for Microwave Access (WiMAX) forum Network Working Group (NWG). For convenience, the terms 802.16 and WiMAX are used interchangeably throughout this specification to refer to the IEEE 802.16 suite of air interface standards.

FIG. 1 shows a simplified broadband wireless network with point-to-multipoint (PMP) cellular-like architecture for operation at both licensed and licensed-exempt frequency bands typically below 11 GHz. Other types of architectures (not shown) such as mesh broadband wireless networks are permissible. A backbone IP (Internet Protocol) network 100 is connected to a broadband wireless network using radio access nodes (RANs) 102A and 102B. Each RAN is connected via a wired link such as an optical fiber (depicted as optical fiber links 103A, 103B and 103C) or point-to-point wireless link (not shown) to one or more radio cells (depicted between RAN 102A or 102B to radio cells 104A, 104B, and 104C). At the hub of a radio cell is a respective Base station (BS) 106A, 106B, and 106C. A Base Station system includes an advanced antenna system (AAS), which is typically located on top of a radio tower and is used to transmit high-speed data to multiple subscriber stations (SSs) 108 and mobile subscriber stations (MSSs) 109 and receive data from the subscriber stations via unidirectional wireless links 110 (each SS uplink transmission is independent on the others). More particularly, each SS 108 can access network 100 (via an appropriate BS) using the PHY+MAC (Physical+Media Access Control) layer features defined by the IEEE P802.16 air-interface standard. An SS may correspond to a fixed subscriber location (e.g., in a home or office), or may correspond to a mobile subscriber who might access the broadband wireless network via a mobile device (MSS) such as a personal digital assistant (PDA), laptop computer, etc.

Transmission of data bursts from network 100 to an SS 108 proceeds in the following manner. The data bursts such as IP packets or Ethernet frames forwarded from an appropriate RAN to an appropriate BS within a given cell. The BS encapsulates the data into IEEE 802.16-2004 data frame format, and then transmits non-line-of-sight (NLOS) data to each SS 108 using a unidirectional wireless link 110, which is referred to as a "downlink." Transmission of data from an SS 108 to network 100 proceeds in the reverse direction. In this case, the encapsulated data is transmitted from an SS to an appropriate BS using a unidirectional wireless link referred to as an "uplink." The data packets are then forwarded to an appropriate RAN, converted to IP Packets or Ethernet frames, and transmitted henceforth to a destination node in network 100. Data bursts can be transmitted using either Frequency-Division-Duplexing (FDD), half-duplex FDD, or Time-Division-Duplexing (TDD) schemes. In the TDD scheme, both the uplink and downlink share the same RF channel, but do not transmit simultaneously, and in the FDD scheme, the uplink and downlink operate on different RF channels, but the channels are transmitted simultaneously.

Multiple BSs are configured to form a cellular-like wireless network. A network that utilizes a shared medium requires a mechanism to efficiently share it. Within each cell, the wireless network architecture is a two-way PMP, which is a good example of a shared medium; here the medium is the space (air) through which the radio waves propagate. The downlink, from the base station (BS) to an SS, operates on a PMP basis. Provisions within the IEEE 802.16-2004 standard and IEEE 802.16e/D5a draft specification (December, 2004) include a central BS with AAS within each cell. Such an AAS includes a sectorized antenna that is capable of handling multiple independent sectors simultaneously. Under this type of configuration, the operations of base stations described below may be implemented for each of the independent sectors, such that multiple co-located base stations with multiple sector antennas sharing a common controller may be employed in the network. Within a given frequency channel and antenna sector, all stations receive the same transmission, or parts thereof.

In the other direction, the subscriber stations share the uplink to the BS on a demand basis. Depending on the class of service utilized, the SS may be issued continuing rights to transmit, or the right to transmit may be granted by the BS after receipt of a request from an SS. In addition to individually-addressed messages, messages may also be sent on multicast connections (control messages and video distribution are examples of multicast applications) as well as broadcast to all stations. Within each sector, users adhere to a transmission protocol that controls contention between users and enables the service to be tailored to the delay and bandwidth requirements of each user application.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2 is a schematic diagram of a network management reference model for broadband wireless network architecture with mobile subscriber stations (MSSs), according to one embodiment of the invention;

FIG. 4a-e are schematic representations of a Management Information (data)Base (MIB) structure employed in the network management reference model of FIG. 2 to facilitate network provisioning and management operations;

FIG. 6a is a table showing the format of a TLV request message;

FIG. 6b is a table showing the format of a TLV response message;

FIG. 7 is a flowchart illustrating operations performed to provision dynamic service flow parameters at an MSS using a proxy Simple Network Management Protocol (SNMP) agent at a base station;

DETAILED DESCRIPTION

Figure 1:
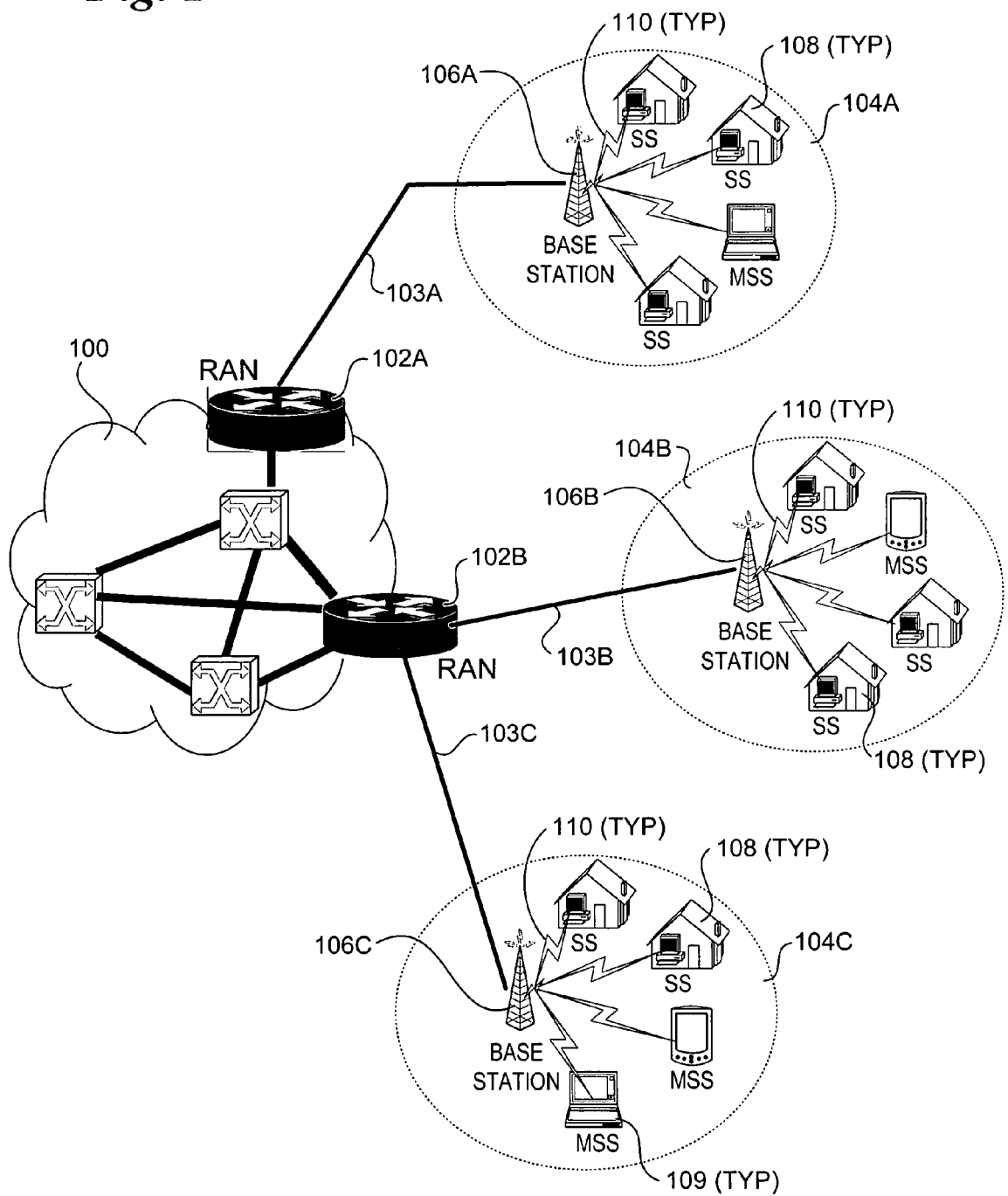
FIG. 1 is a schematic diagram of an exemplary broadband wireless network with point-to-multipoint topology based on the IEEE 802.16 suite of standards.

Embodiments of a method and systems of software architectures to support network management and service provisioning for mobile broadband wireless networks are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

One of the more important aspects designed into 802.16-based broadband wireless networks is the ability to support mobile subscribers. Notably, this is one of the weak links with present cellular-based networks. While modern "2½ G" and "3 G" cellular services enable subscribers to receive and send data from mobile platforms, the transmission rates are relatively poor. A significant reason for this is that the underlying delivery mechanisms (the cellular networks) were originally intended for voice communication, which requires relatively low transmission rates.

The MBWA architecture being standardized by the WiMAX forum Network Working Group (NWG) is targeted to provide support for optimum transmission rates for mobile subscribers. At the same time, the MBWA architecture has also been designed to support the rich service capabilities such as high-speed data, streaming videos, and voice-over-IP (VoIP) services that were originally targeted for fixed subscriber stations to fulfill the "last mile/first mile" service requirements.

Another important aspect of WiMAX networks is service provisioning. To enable end-user access to a WiMAX network, the user's SS and service flows (i.e., unidirectional flow of MAC service data units on a connection with a particular quality of service (QoS)) must be provisioned. Unlike the limited QoS support provided by the more simplistic Wi-Fi (i.e., IEEE 802.11) networks commonly used to provide wireless network access in today's environments, the IEEE 802.16 architecture supports a rich set of QoS features. Furthermore, WiMAX employs a more sophisticated wireless air interface than does Wi-Fi, thus requiring more complex service provisioning considerations.

More specifically, WiMAX is based on a centralized control architecture, where the scheduler in the BS has complete control of the wireless media access among all SS's. WiMAX can simultaneously support multiple wireless connections that are characterized with a complete set of QoS parameters. Moreover, WiMAX provides the packet classifier to map these connections with various user applications and interfaces, ranging from Ethernet, TDM (Time-Division Multiplexing), ATM (Asynchronous Transfer Mode), IP (Internet Protocol), VLAN (Virtual Local Area Network), etc. However, the rich feature set and flexibility in WiMAX also increases the complexity in the service deployment and provisioning for fixed and mobile broadband wireless access networks.

FIG. 2 shows a management reference model 200 of Broadband Wireless Access (BWA) networks, according to one embodiment of the invention. The model includes a Network Management System (NMS) 202, managed base station nodes (depicted as managed nodes 204₁ and 204₂ for exemplary base stations 206 and 208), and a Service Flow Database 210 hosted by a database server 212. The NMS 202 and Service Flow Database are linked in communication to the WiMAX network's BSs (e.g., base station 206 and 208) via a network 214, which may typically be a wide-area network (WAN) or public network (e.g., the Internet). The BS managed nodes collect and store managed objects in an 802.16 Management Information Base (MIB) format, as depicted by MIB instances 218 and 220. In one embodiment, managed objects are made available to NMSs (e.g., NMS 202) using the Simple Network Management Protocol (SNMP) as specified by IETF RFC (request for comments) 1157 (i.e., http://www.faqs.org/rfcs/rfc1157.html).

Each of base stations 206 and 208 provide a respective coverage area. The "footprint" (i.e., shape) of each coverage area will generally depend on the type of antenna system provided (e.g., single sector, multiple sector or omni-directional) by the base station in combination with geographical and/or infrastructure considerations and the power of the radio signal. For example, although referred to as non-line-of-sight (NLOS), geographical terrain such as mountains and trees, and public infrastructure such as large buildings may affect the wireless signal propagation, resulting in a reduced coverage area. The radio signal strength for WiMAX transmissions are also limited by the available RF spectrum for licensed and/or licensed-free operations. For simplicity, the respective coverage areas 222 and 224 for base stations 206 and 208 are depicted as ovals.

A given base station is able to support communication with both MSSs and fixed SSs within its coverage area. In order to support complete mobility, the coverage area of proximate "neighbor" base stations must have some degree of overlap, as depicted by an overlap coverage area 226 in FIG. 2. As an MSS moves throughout the coverage area (such as depicted by an MSS 228 moving between coverage areas 222 and 224), its signal-strength data is periodically gathered to assess which BS should be used to best maintain the current level of service. In view of this signal strength data, as well as other considerations detailed below, the BS used to provide services to a given MSS will be switched as the MSS moves within various BS coverage areas via a hand-over (HO) process. Details of hand-over process operations are described below.

As used herein, a mobile subscriber station generally refers to electronic device that enables communication with base stations in a broadband wireless network. An MSS can be, for example, an IEEE 802.16e chipset inside an express card or network interface card, which comprises a plug-in component for a mobile client platform, such as a notebook computer (e.g., notebook computer 230 depicted in FIG. 2), hand-held device (PDA, pocket PC, mobile phone, etc.)

The Service Flow Database 210 contains the service flow and the associated QoS information that directs the BS and SS/MSS in the creation of transport connections when a service is provisioned, an SS enters the WiMAX network, or a mobile SS roams into a BS coverage area. In general, SSs/MSSs can be managed directly from an NMS, or indirectly through a BS that functions as an SNMP proxy. In one embodiment, the management information between as SS/MSS and a BS is carried over a Primary or Secondary Management CID (Connection Identifier) for a managed SS/MSS.

There are three types of service flows defined by the IEEE 802.16-2004 standard, including provisioned service flows, admitted service flows, and active service flows. A provisioned service flow is a service flow that is provisioned but not immediately activated. External triggers are use to transition a provisioned service flow to an admitted service flow. This service flow is initiated when an SS enters the network through a network entry procedure, with provision commands being managed by the NMS.

Under an admitted serve flow, a network resource is reserved through admission control. Under one technique, external triggers are used to transition an admitted service flow to an active service flow. Under another technique, dynamic service addition (DSA) messages may be employed to produce a similar result. Events similar to "off-hook" in a telephony model are employed to activate an unsolicited grant service (UGS) service flow. Application triggers may also be employed to effect the transition to an active service flow.

An active service flow is a service flow that is active. That is, it is a service flow that is granted network resources such as uplink and downlink bandwidth for data transport usage. It employs an active QoS parameter set that is a subset of the Admitted QoS parameter set.

Figure 3A:
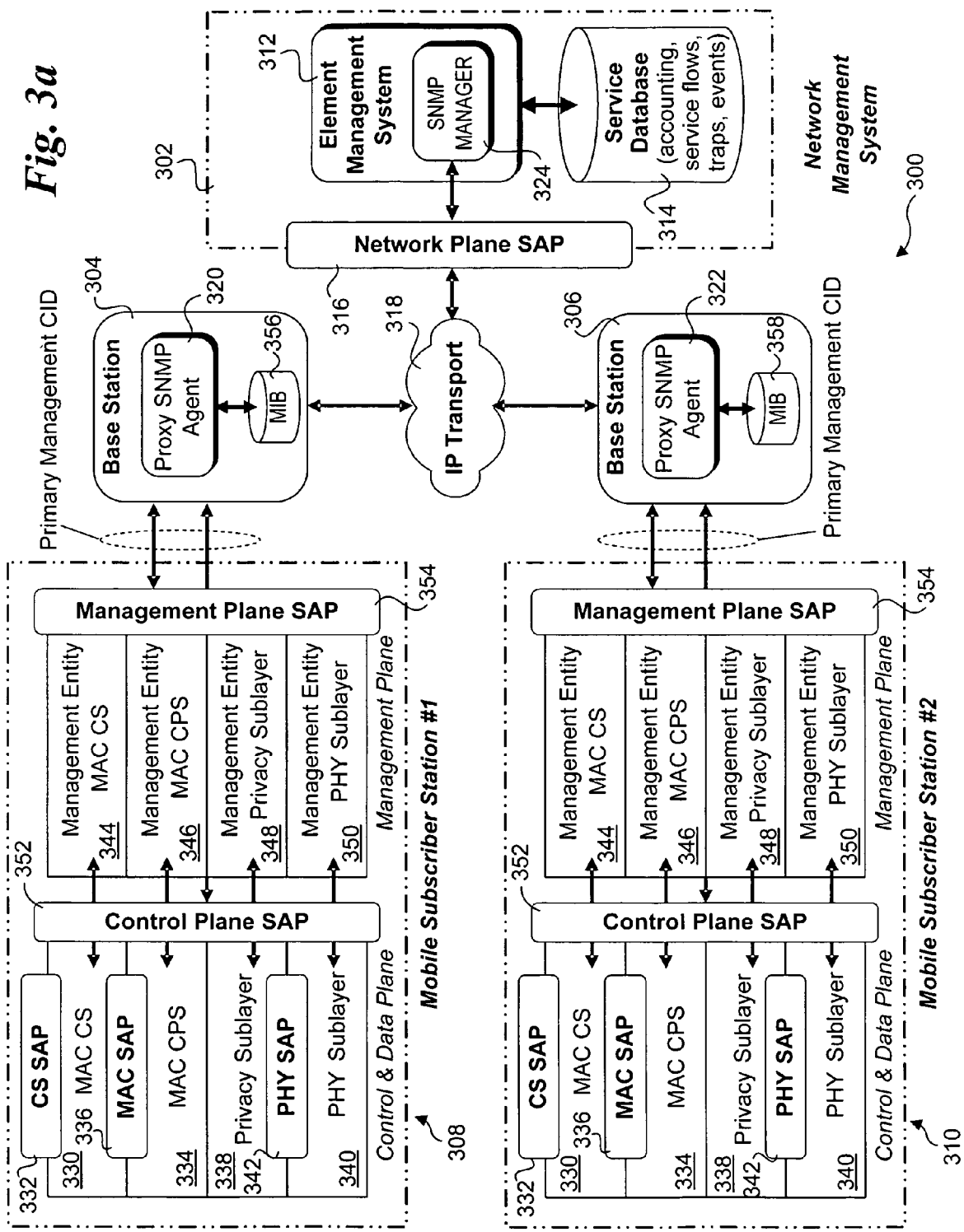
FIG. 3a is a schematic diagram of a protocol layering reference model with network management for MSSs in a broadband wireless access (BWA) network with corresponding control, data, and management plane software architecture, according to one embodiment of the invention.
Figure 3B:
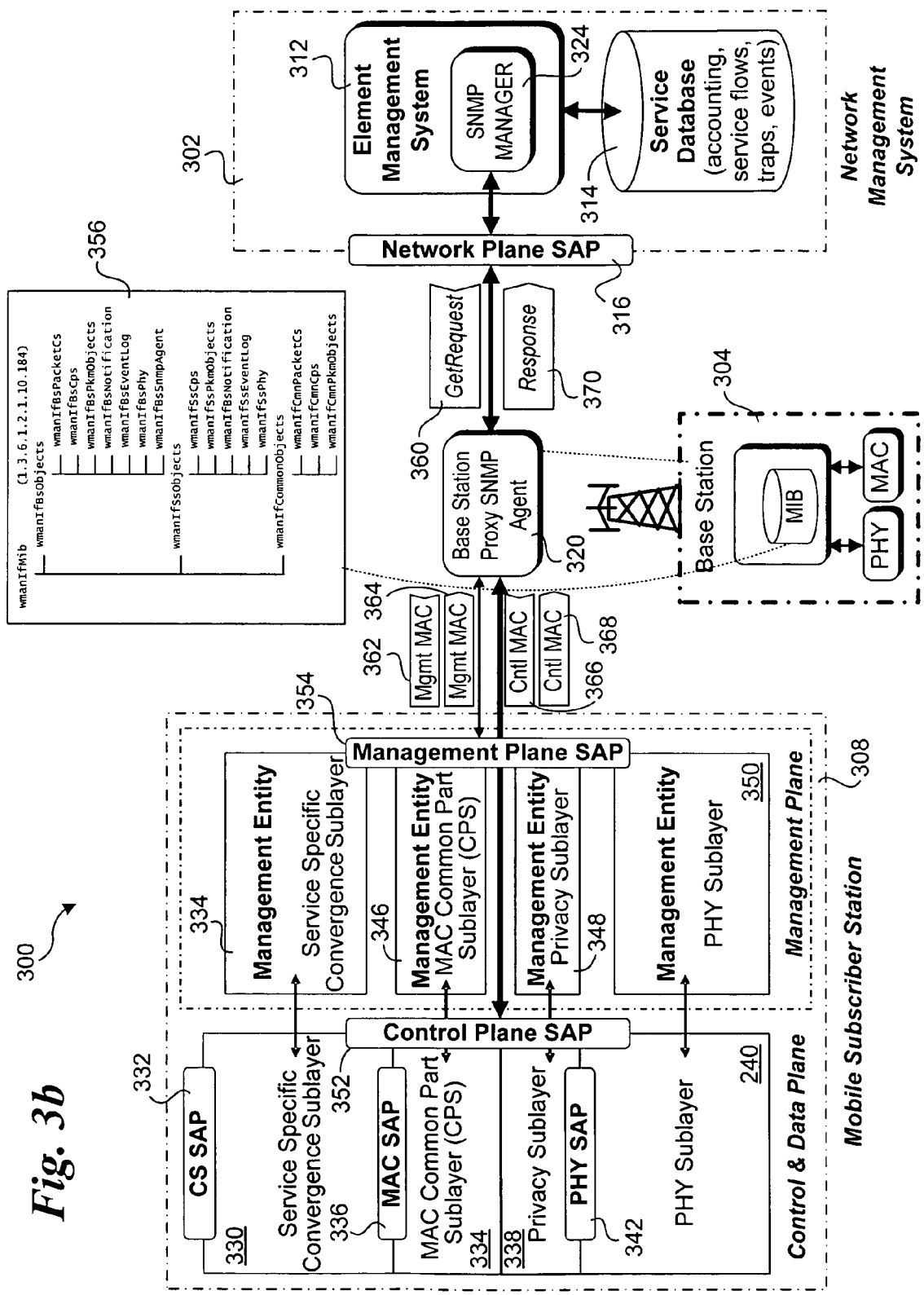
FIG. 3b is a schematic diagram of the protocol layering reference model with network management of FIG. 3a, further illustrating message flows in connection with retrieving parameters from an MSS.
Figure 3C:
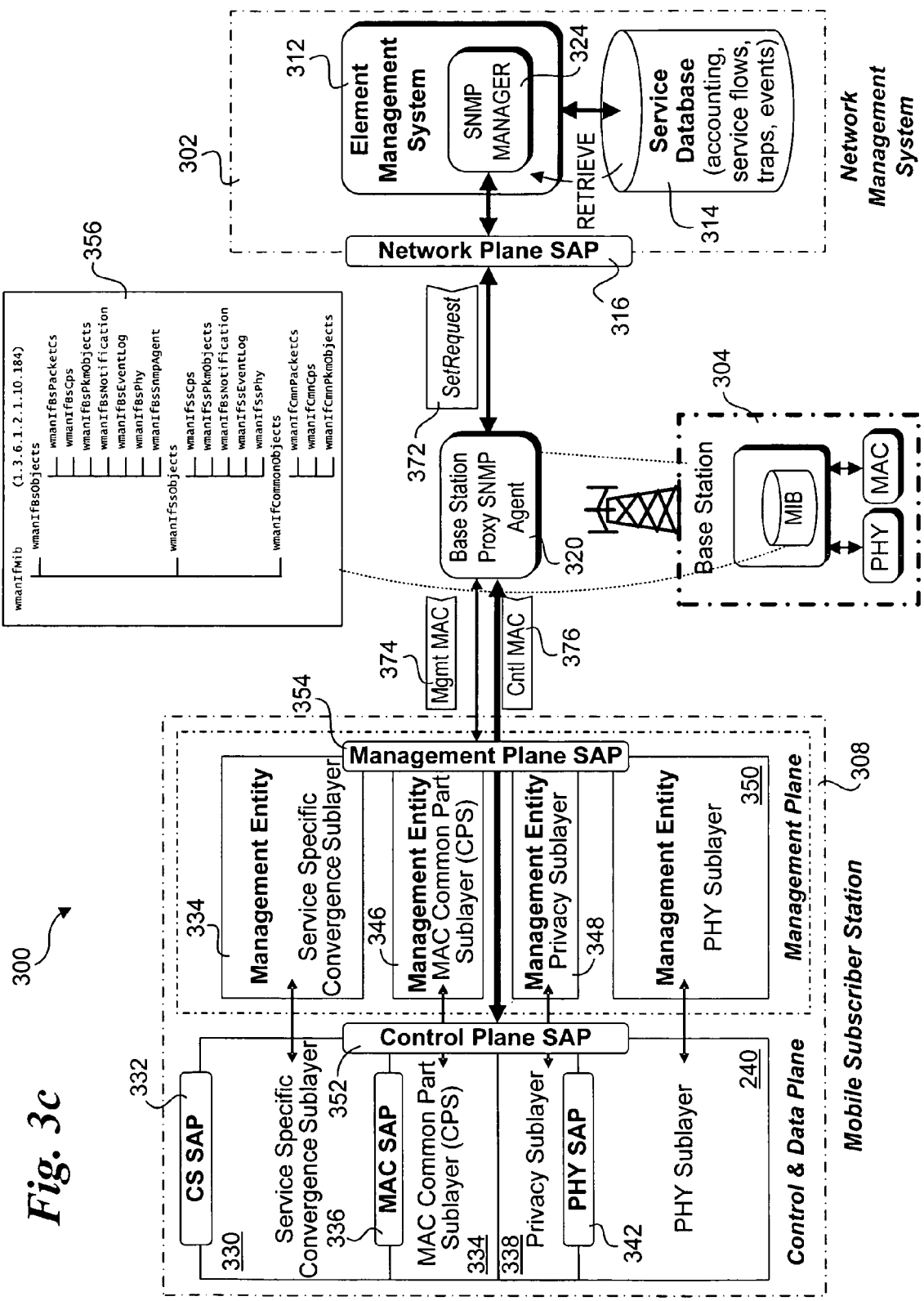
FIG. 3c is a schematic diagram of the protocol layering reference model with network management of FIG. 3a, further illustrating message flows in connection with sending parameters to an MSS.

Details of one embodiment of a protocol layering reference model with network management 300 for mobile BWA networks are shown in FIGS. 3a, 3b, and 3c. The network management reference model includes a network management system 302, which is used to manage various network elements, as depicted by base stations 304 and 306 and MSSs 308 and 310. Network management system 302 includes an element manager system (EMS) 312, which is linked in communication with a service database 314 in which various service provider data are stored, including data related to MSS and SS service flows (similar to that stored in service flow database 210, traps, and events. A network plane service access point (SAP) 316 is used to provide an interface between EMS 312 and base stations 304 and 306 that enables the EMS to communication with the base stations via IP transmissions, depicted as an IP transport cloud 318.

Under a conventional EMS model, an EMS is used to manage one or more types of network elements in the system. For example, in a telecommunications system, an EMS may be employed to manage the operations of various telecom switches and similar network elements. Similar EMS 312 is used to manage network elements in the BWA system, such as base stations 304 and 306. However, unlike the conventional EMS model approach, the architecture of management reference model 300 enables EMS 312 to also manage mobile subscriber stations via proxy management services provided at the base stations.

In further detail, an SNMP proxy agent is provided at each base station, as depicted by Proxy SNMP agents 320 and 322. The proxy SNMP agents are enabled to communicate with EMS 312 via an SNMP manager 324 using conventional SNMP messages. SNMP is based on the manager/agent model consisting of a manager, an agent, a database of management information, managed objects and the network protocol. The manager executes management applications that monitors and control managed network elements. The agent is a management software module that resides in a managed device to execute the commands from the manager.

The manager and agent use a Management Information Base (MIB) and a relatively small set of commands to exchange information via corresponding SNMP messages. The MIB is organized in a tree structure with individual variables, such as point status or description, being represented as leaves on the branches. The information passed between the SNMP manager and agents comprise one or more MIB objects encapsulated in SNMP messages, also commonly referred to as protocol data units or PDUs. The SNMP message format comprises a wrapper that encapsulates a PDU along with header fields.

SNMP PDUs are arranged in classes based on their function. Table 1 below shows the SNMP PDU (Message) classes under the current version (SNMPv3), along with the earlier SNMPv1 version PDU classes. There are also three additional classes (Internal, Confirmed, and Unconfirmed) which are not shown in Table 1 for simplicity.

TABLE 1

| SNMPv3 PDU Class | Description | SNMPv1 PDUs | SNMPv2/SNMPv3 PDUs |
| --- | --- | --- | --- |
| Read | Messages that read management information from a managed device using a polling mechanism | GetRequest-PDU GetNextRequest-PDU | GetRequest-PDU GetNextRequest-PDU GetBulkRequest-PDU |
| Write | Messages that change management information from a managed device to affect the device's operation | SetRequest-PDU | SetRequest-PDU |
| Response | Messages sent in response to a previous request | GetResponse-PDU | Response-PDU |
| Notification | Messages used by a device to send an interrupt-like notification to an SNMP manager | Trap-PDU | Trapv2-PDU InformRequest-PDU |

As discussed above, SNMP employs MIBs at the managed devices. This requires 15 an SNMP agent to manage the objects in the MIB instance for a given device. Accordingly, each of proxy SNMP agents 320 and 322 are configured to operate as a SNMP agent, in addition to performing SNMP proxy operations described below.

Under network management reference model 300, SNMP messaging is not employed for sending management information between a base station and the subscribers it servers (e.g., MSSs 308 and 310). Rather, a simplified protocol that employs Management MAC messages is used to transfer this information.

Each of mobile subscriber stations 308 and 310 implement control and data plane components defined by the IEEE Std. 802.16-2001 protocol layering reference model. Under this protocol layering reference model, the MAC layer comprises three sublayers. The MAC Service Specific Convergence Sublayer (CS) 330 provides any transformation or mapping of external network data, received through the CS service access point (SAP) 332, into MAC Service Data Units (SDUs) received by the MAC Common Part Sublayer (MAC CPS) 334 through the MAC SAP 336. This includes classifying external network SDUs and associating them to the proper MAC service flow and Connection Identifier. It may also include such functions as payload header suppression. Multiple CS specifications are provided for interfacing with various protocols. The internal format of the CS payload is unique to the CS, and the MAC CPS is not required to understand the format of or parse any information from the CS payload.

The MAC CPS 334 provides the core MAC functionality of system access, bandwidth allocation, connection establishment, and connection maintenance. It receives data from the various CSs, through the MAC SAP 336, classified to particular MAC connections. Quality of Service is applied to the transmission and scheduling of data over the PHY.

The MAC also contains a separate Privacy Sublayer 338 providing authentication, secure key exchange, and encryption. Data, PHY control, and statistics are transferred between the MAC CPS and the PHY sublayer 340 via the PHY SAP 342.

Each of mobile subscriber stations 308 and 310 also implement management plane components depicted in the IEEE Std. 802.16-2001 protocol layering reference model. The management plane elements include a MAC CS management entity 344, a MAC CPS management entity 346, a privacy sublayer management entity 348, and a PHY sublayer management entity 350.

Although the foregoing management plane components are included as part of the IEEE Std. 802.16-2001 protocol layering reference model (note that in the protocol layering reference model the privacy sublayer is actually included as part of the MAC CPS management entity and not shown separately as depicted herein), specifications for implementing the management plane are not included under the scope of the IEEE Std. 802.16-2001 or the current IEEE Std. 802.16-2004 specification. This further includes communication facilities between the control/data plane and the network management system (which is simply depicted as an external element under the IEEE Std. 802.16-2004 protocol layering reference model), and between the management plane and the network management system. Under the protocol layering reference model with network management 300, these respective communication facilities are provided by a control plane SAP 352 and a management plane SAP 354.

Management data, in the form of MIB objects, are transferred between the base stations and the network management system using SNMP messages encapsulating such data. The MIB objects themselves are embodied as PDU variable bindings comprising a bind between on object name and its corresponding value. The management objects for a given base station are stored in that base station's MIB instance, as depicted by MIB instances 356 and 358 in FIG. 3a.

Figure 4A:
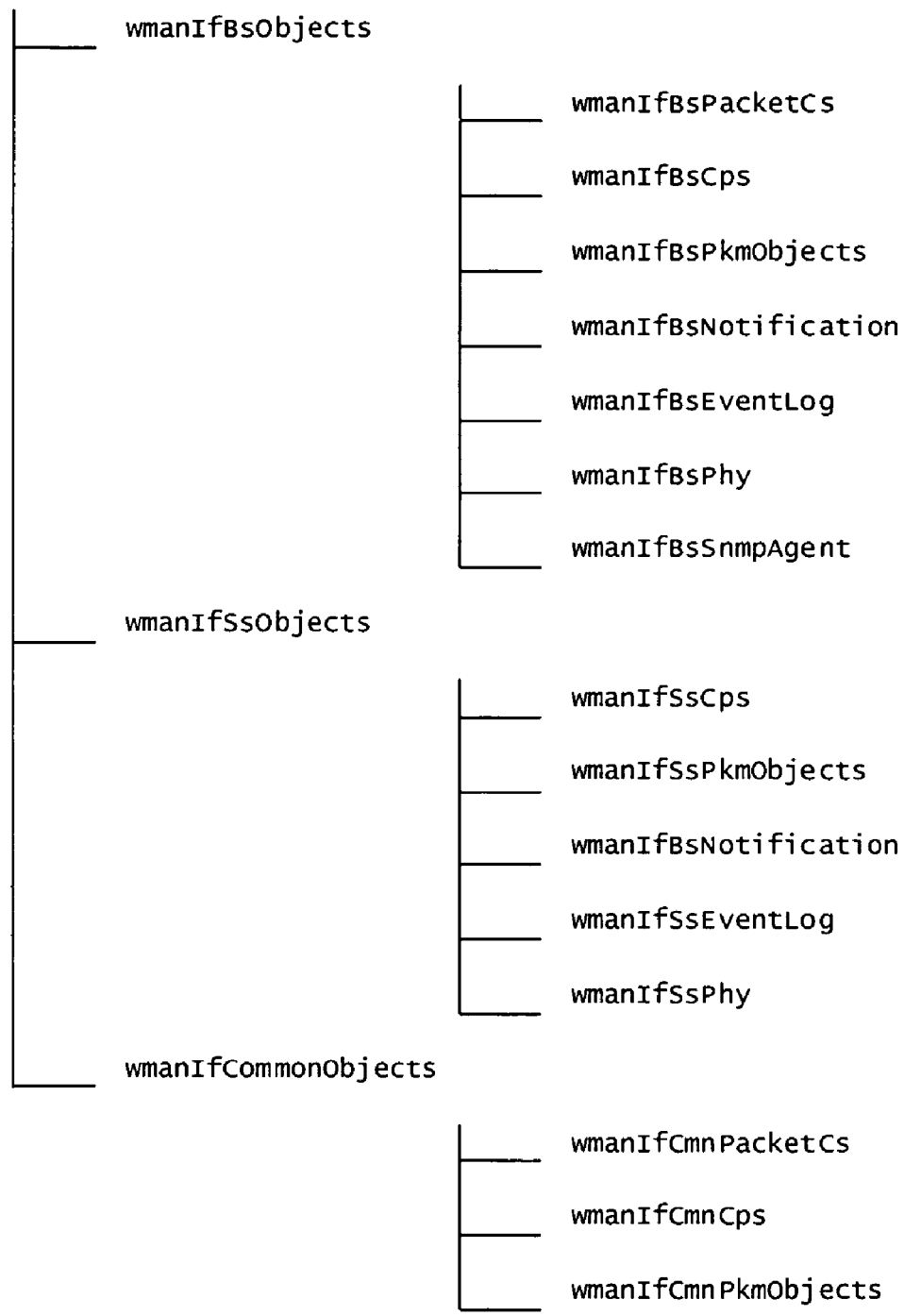

FIGS. 4a-e show details of various hierarchy level for a wmanIfMib (wireless MAN interface) MIB data structure 400, according to one embodiment. The MIB data structure includes multiple MIB objects nested at various levels (groups) in an object hierarchy. At the top of the hierarchy is the wmanifMib object shown in FIG. 4a. The next hierarchy level includes the wmanifBsObjects, the wmanIfSsobjects, and the wmanIfCommonObjects. The wmanifBsObjects include a group of managed objects to be implemented by a base station; details of one embodiment of the wmanifBsObjects are shown in FIGS. 4b and 4c. The wmanIfSsobjects include a group of managed objects pertaining to subscriber station operations; details of one embodiment of the wmanIfSsobjects are shown in FIGS. 4e. The wmanIfCommonObjects include a group of common managed objects pertaining to both base stations and the subscriber stations; details of one embodiment of the wmanIfCommonObjects are shown in FIGS. 4d. In connection with other SNMP management operations, wmanIfMib MIB data structure 400 may be implemented as a sub-tree under the Interfaces Group MIB defined in RFC (request for comment) 2863 (i.e., http://www.faqs.org/rfcs/rfc2863.html).

Under the conventional usage defined by the IEEE P802.16f/D2, December 2004 MIB draft specification, the wmanIfSsobjects are to be implemented by a subscriber station. Similarly, under this MIB specification, the wmanIfCommonObjects are to be implemented in base stations and the subscriber stations. However, under network management reference model 300, there are no MIB instances maintained by the MSSs. Rather, the wmanIfSsobjects and the SS portion of the wmanIfCommonObjects pertaining to a given MSS are stored in the MIB instance for the base station providing service to that MSS.

Figure 5:
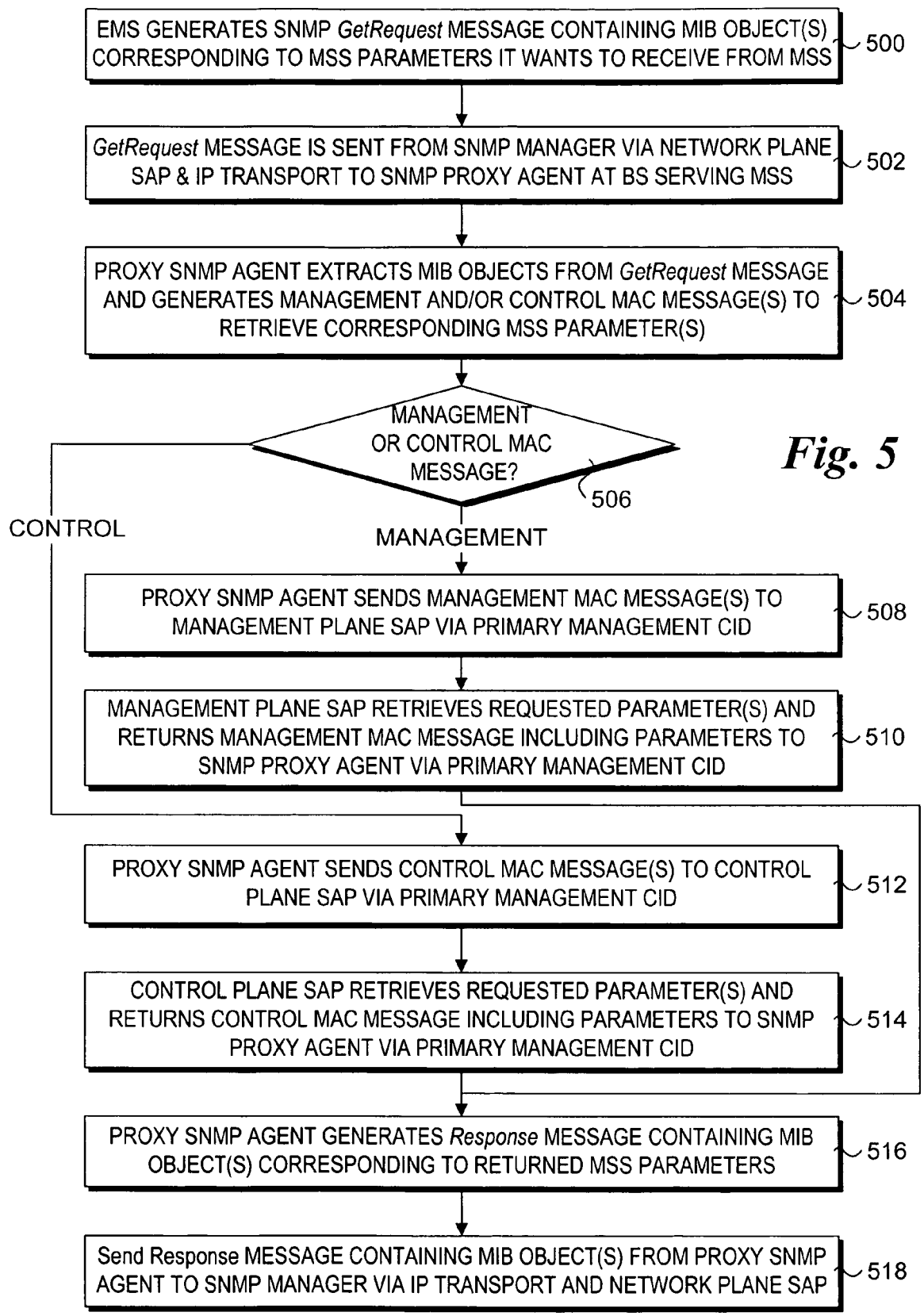
FIG. 5 is a flowchart illustrating operations performed to retrieve parameters from in MSS, according to one embodiment of the invention.

Details of operations performed in connection with retrieving operation and/or dynamic service flow parameters from an MSS under one embodiment are shown in FIG. 5, while the corresponding message flow sequence is depicted in FIG. 3b. The process begins in a block 500, wherein EMS 312 generates a SNMP GetRequest message containing the MIB object(s) corresponding to MSS parameters the EMS wants to receive from a selected MSS. In general, the MSS will be currently served by one of the base stations managed by network management system 302, and will be identified by a unique identifier, such as its MAC address. Based on active service flow information maintained in service database 314 and/or MIB 356, the base station serving the MSS can be readily identified. For purpose of illustration, it is presumed that the MSS is MSS 308 and the serving base station is base station 304.

After the SNMP GetRequest message is generated, it is sent from SNMP manager 324 to proxy SNMP agent 320 at base station 304 via network plane SAP and IP transport 318, as depicted in a block 502. This is schematically depicted in FIG. 3b as a GetRequest message 360. In response to receiving GetRequest message 360, proxy SNMP agent 320 extracts the MIB objects (e.g., name-value bindings) from the message and generates appropriate management and/or control MAC messages to retrieve the corresponding MSS parameters in a block 504. The type and number of the messages will depend on whether the parameters are employed by the MSS's management plane or control and data plane, and how many parameters are requested.

As depicted by a decision block 506, for each management MAC message that is generated the logic proceeds to a block 508, wherein proxy SNMP agent 320 sends the management MAC message 362 to management plane SAP 354 via the primary management CID. Upon receiving a management MAC message 362, management plane SAP 354 retrieves the requested parameters from one or more appropriate management entities and returns the retrieved parameters in a management MAC message 364 to proxy SNMP agent 320 via the primary management CID.

The message exchange for control MAC messages is similar, except the MAC messages are now sent to and returned from control plane SAP 352. In further detail, for each control MAC message generated in block 504, decision block 506 directs the process to a block 512, wherein proxy SNMP agent 320 sends a control MAC message 366 to control plane SAP 352 via the primary management CID. Upon receiving a control MAC message 366, control plane SAP 352 retrieves the requested parameters from one or more appropriate control and data plane components and returns the retrieved parameters in a control MAC message 368 to proxy SNMP agent 320 via the primary management CID.

Upon receiving the requested parameters for GetRequest 360 via corresponding management MAC messages 364 and/or control MAC messages 368, proxy SNMP agent 320 generates an SNMP Response message in a block 516 containing the MIB object(s) corresponding to the parameters returned in blocks 510 and/or 514 by the MAC messages. The SNMP Response message 370 is then sent from proxy SNMP agent to SNMP manager 324 via IP transport 318 and network plane SAP 316 in a block 518 to complete the MSS parameter retrieval process.

Details of embodiment of message formats used for management MAC messages and control MAC messages are shown in FIGS. 6a and 6b. More particularly, FIG. 6a depicts the format of a TLV (Tag/Length/Value) Request (TLV_REQ) message that may be used for submitting a request to management plane 354 or control plane 352 for an MSS, while FIG. 6b depicts the format of a TLV Response (TLV_RSP) message that may be used for returning a management or control MAC response message from management plane 354 or control plane 352 to the proxy SNMP agent at the base station. In one embodiment management MAC messages handled by management plane SAP 354 may be employed to convey the following, but not limited to, parameters: Configuration file encodings (Section 11.2 in IEEE 802.16-2004); Global parameters (Section 10.1 in IEEE 802.16-2004); PKM parameters (Section 10.2) in IEEE 802.16-2004); MSS trap control; MSS threshold configuration; MSS performance data (e.g., FEC counters) and MSS events.

Details of operations performed in connection with sending MIB objects to provision dynamic service flows to BSs, and subsequent passing of dynamic service flow parameters to an MSS under one embodiment are shown in FIG. 7, while the corresponding message flow sequence is depicted in FIG. 3c. The process starts in a block 700, wherein EMS 312 retrieves data from service database 314 corresponding to the MIB object(s) to be sent. EMS 312 then generates an SNMP SetRequest message 372 containing the MIB objects in a block 702. In a block 704, SetRequest message 372 is sent from SNMP manager 324 to proxy SNMP agent 320 via network plane SAP 316 and IP transport 318 as depicted in FIG. 3c. Upon receipt of SetRequest message 372, proxy SNMP agent 320 extracts the MIB object(s) and populates appropriate MIB subtrees in MIB instance 356 corresponding to applicable BS and (M)SS MIB objects, as depicted in a block 706.

In a decision block 708, a determination is made to whether any parameters need to be sent to MSS 308. If the answer is NO, the process is complete. If the answer is YES, the process proceeds to a decision block 710 in which a determination is made to whether the parameters are to be sent via a management MAC message or a control MAC message. For each applicable management MAC message, proxy SNMP agent 320 generates and sends a management MAC message 374 containing management plane parameters to management plane SAP 354 via the primary management CID in a block 712. The management plane SAP then provides the sent parameter(s) to one or more targeted management entities (as applicable) in the management plane, as depicted by in a block 714, completing the process. For each applicable control MAC message, proxy SNMP agent 320 generates and sends a control MAC message 376 containing data/control plane parameters to control plane SAP 352 via the primary management CID in a block 716. The control plane SAP then provides the sent parameter(s) to a targeted MAC component in the control/data plane, as depicted in a block 718, completing the process.

Figure 8:
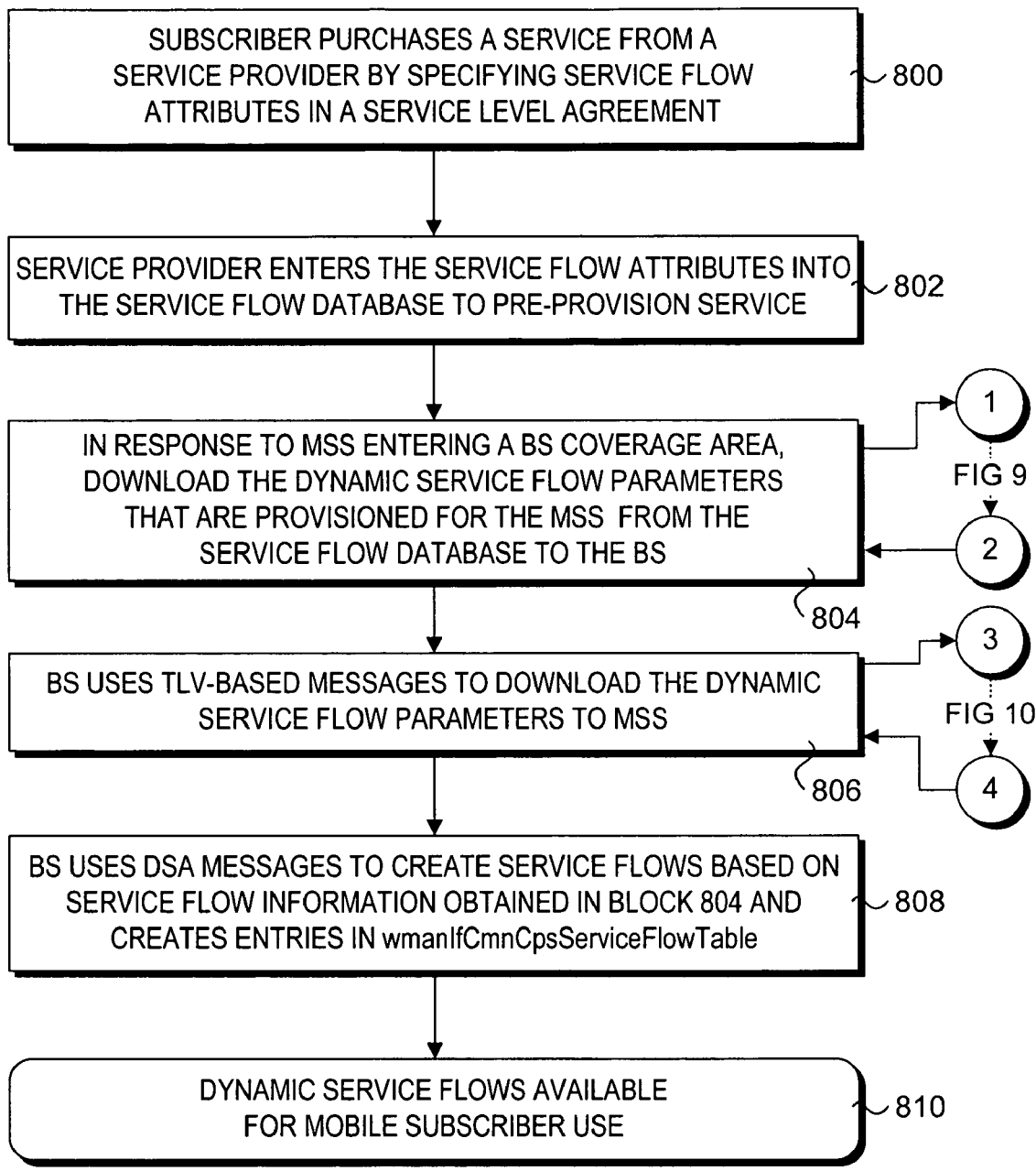
FIG. 8 is a flowchart illustrating operations performed during provisioning service flows for a mobile subscriber station, according to one embodiment of the invention.

FIG. 8 shows a flowchart illustrating operations performed to provision dynamic service flows for a mobile subscriber, according to one embodiment of the invention. The process begins in a block 800, wherein the subscriber purchases a broadband wireless service from a service provider by specifying dynamic service flow attributes in a service level agreement. When a customer subscribes to the service, he or she will communicate the service provider the dynamic service flow information corresponding to the desired level of service, including the number of UL/DL connections that are requested, along with the data rates and QoS parameters for those connections, and along with what kind of applications (e.g., Internet, voice, video, etc.) he or she intends to run. In response to the subscriber entries, the service provider will pre-provision the services by entering the corresponding dynamic service flow attributes in service database 314, as shown in a block 802.

Figure 9:
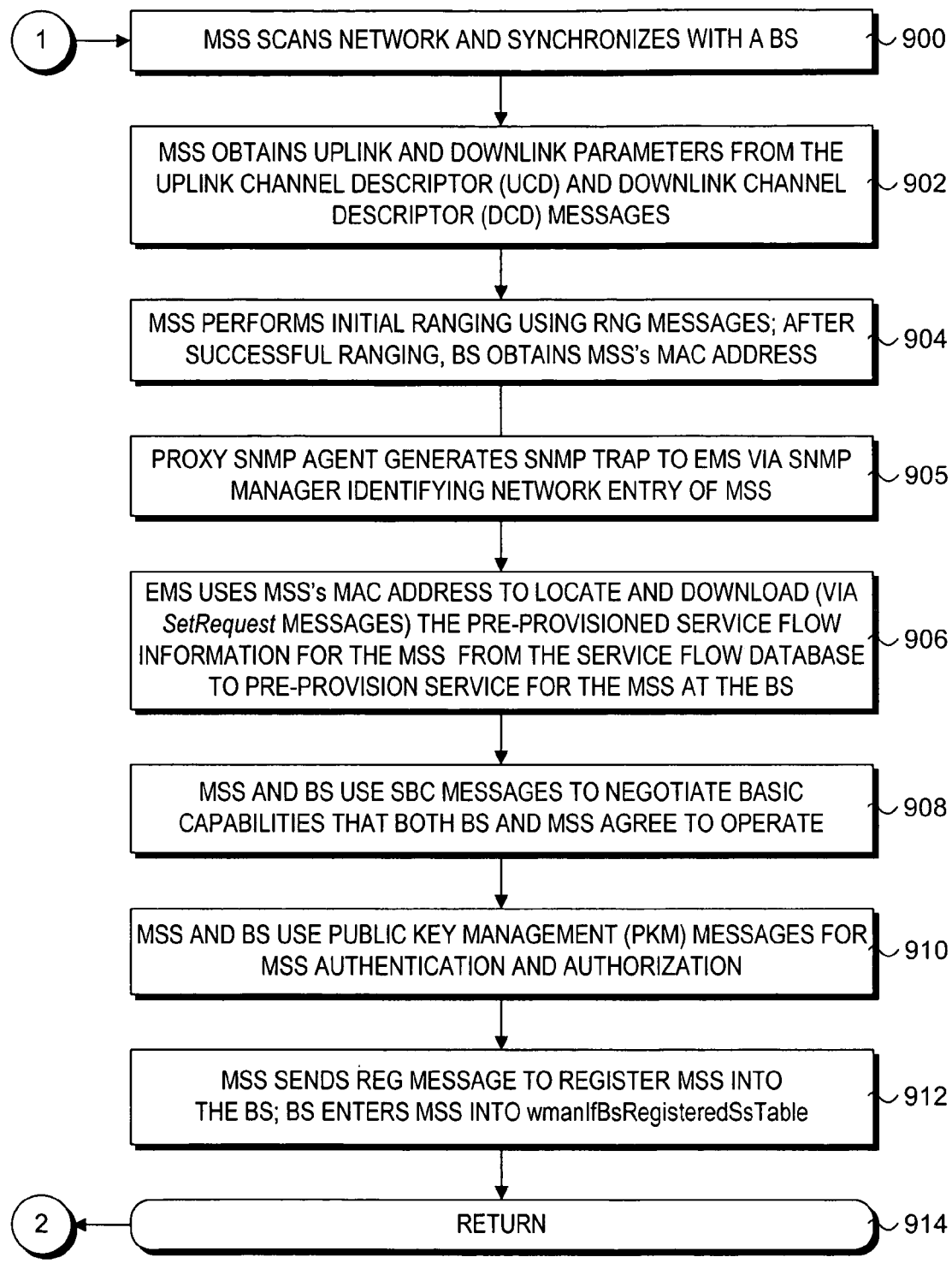
FIG. 9 is a flowchart illustrating details of the service flow provisioning operations of block 804 in FIG. 8.

In response to an MSS entering a BS coverage area, the BS downloads dynamic service flow parameters that are provisioned for the MSS from service database 314 in a block 804. Details of one embodiment of these operations are shown in FIG. 9.

The process begins in a block 900, wherein an MSS performs a scanning operation and synchronizes with BS. Generally, scanning is performed to identify base stations within the range of the MSS and select the best BS to provide service for the MSS. During scanning, an MSS scans neighboring BS to measure radio signal reception strength. In further detail, a carrier-to-interference plus noise ratio (CINR) and/or relative-signal strength indicator (RSSI) are measured to a resolution of 0.5 decibels (dB) using a pre-defined process and message exchange sequence. Prior to performing a scan, an MSS and its serving BS exchange MOB_SCN_REQ (mobile scan request) and MO_SCN_RSP (mobile scan response) message to set up a timeframe for performing the scan. Once a BS is selected to serve the MSS, the MSS and BS perform a synchronization operation to establish uplink and downlink communication channels.

In a block 902, the MSS obtains uplink and downlink parameters from corresponding uplink channel descriptor (UDC) and downlink channel descriptor (DCD) messages. The MSS then performs initial ranging using RNG messages. Under this operation, the MSS sends a RNG_REQ ranging request message to a BS, which returns an RNG_RSP ranging response message containing current ranging information. After successful ranging, the BS obtains the MSS's MAC (Media Access Channel) address.

In a block 905, the BS proxy SNMP agent generates an SNMP trap to EMS 312 via SNMP manager 324. Under the SNMP model, SNMP traps are used to send information from an SNMP agent to an SNMP manager (without the manager asking for the information). The SNMP trap identifies the type of trap, and includes a variable binding identifying the MAC address of the MSS In a block 906, EMS 312 uses the MSS's MAC address as a lookup parameter to download the service flow information corresponding to the MSS (entered above in block 802) from service database 314 using SetRequest messages to pre-provision service for the MSS at the BS. In conjunction with the operations of block 906, the wmanIfBsProvisionedSfTable is populated with the corresponding service flow information, while corresponding QoS parameters are entered in the wmanIfBsServiceClassTable and corresponding classifier rules are entered in the wmanBsClassifierRuleTable.

After the appropriate BS MIB objects (e.g., tables) are populated with the pre-provisioned service flow data, the MSS and BS exchange subscriber basic capability (SBC) messages to negotiate basic capabilities that both the BS and MSS agree to operate, as depicted in a block 908. Next, in a block 910, the MSS and BS use public key management (PKM) messages for MSS authentication and authorization according to IEEE 802.16e/D5a draft specification (December, 2004). As depicted in a block 912, the MSS then sends a REG-REQ message to register the MSS into the BS and receives a REG-RSP message from the BS in reply. The BS then enters the MSS into its wmanifBsRegisteredSsTable using its MAC address to identify the MSS. Based on the MAC address, the BS will be able to find the service flow information that has been pre-provisioned for the MSS in the wmanIfBsProvisionedSfTable, the wmanIfBsServiceClassTable, and the wmanBsClassifierRuleTable. This completes the flowchart operations of FIG. 9, with the process returned to block 804 of FIG. 8, as depicted by a return block 914.

Figure 10:
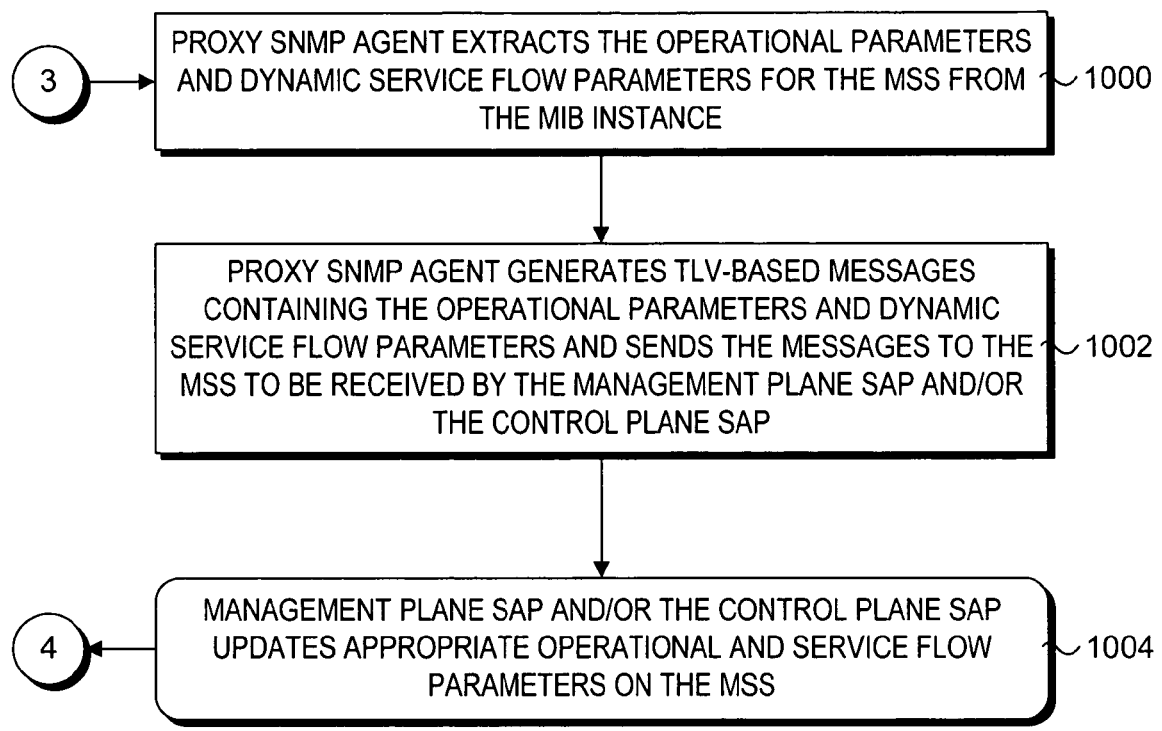
FIG. 10 is a flowchart illustrating details of the dynamic service flow parameter download operation of block 806 in FIG. 8.

Continuing at a block 806 in FIG. 8, after the operations of the flowchart of FIG. 9 are performed, the BS downloads the operational parameters and dynamic service flow parameters as defined in the wmanIfMib to the MSS. Details of one embodiment of the operations for block 806 are shown in FIG. 10.

The process starts in a block 1000, wherein the proxy SNMP agent extracts the operational parameters and dynamic service flow parameters for the MSS from the MIB instance. Optionally, these parameters may be extracted from the SNMP SetRequest message(s) as they are received. In a block 1002, the proxy SNMP agent generates TLV-based messages containing the operational parameters and dynamic service flow parameters and sends the messages to the MSS to be received by the management plane SAP and/or the control plane SAP, as appropriate. The management plane SAP and/or the control plane SAP then update appropriate operational and service flow parameters for the MSS in a return block 1004, which returns the process to block 808 in FIG. 8.

Continuing at a block 808, upon completing the download of the operational parameters and dynamic service flow parameters to the MSS, the BS uses Dynamic Service Addition (DSA) messaging to the MSS to create dynamic service flows with the pre-provisioned dynamic service flow information obtained in block 804 and creates corresponding entries in the wmanIfCmnCpsServiceFlowTable. Details of the DSA message syntax can be found in Section 6.3.2.3.10 for the DSA-REQ message, Section 6.3.2.3.11 for the DSA-RSP message, and in Section 6.3.2.3.12 for the DSA-ACK message in IEEE 802.16-2004 standard.

The wmanIfCmnCpsServiceFlowTable contains both service flow information and QoS parameters. Depending on the network condition, the QoS parameters in wmanIfCmnCpsServiceFlowTable may correspond to a lower service level than what have been pre-provisioned for a given MSS in wmanIfBsProvisionedSfTable. In one embodiment, the classifier rules will be created in the classifier rules table (not shown) in the BS. The dynamic service flows will then be available for the subscriber to send data traffic, as depicted by an end block 810. In response to appropriate conditions that invoke corresponding triggers, the pre-provisioned service flows will be advanced to admitted and then active service flows.

As an MSS moves throughout a network coverage area, its signal-strength will weaken such that a hand-over (HO) process is warranted. More particularly, the HO process is the process under which an MSS migrates its air-interface from a (currently) serving BS to a target (for future service) BS. Upon HO completion, the target BS becomes the new serving BS. Under a conventional HO process, the MSS needs to synchronize with the target BS downlink channel, obtain the uplink parameters and perform its network re-entry process, including re-authorization, re-registration, and re-establish its IP connectivity in a manner similar to that employed for new MSS entering the network according to the IEEE 802.16e/D5a draft specification (December, 2004). This conventional HO process requires a large amount of message traffic, resulting in a significant time-delay as well as significant workload levels at the BSs.

Figure 11:
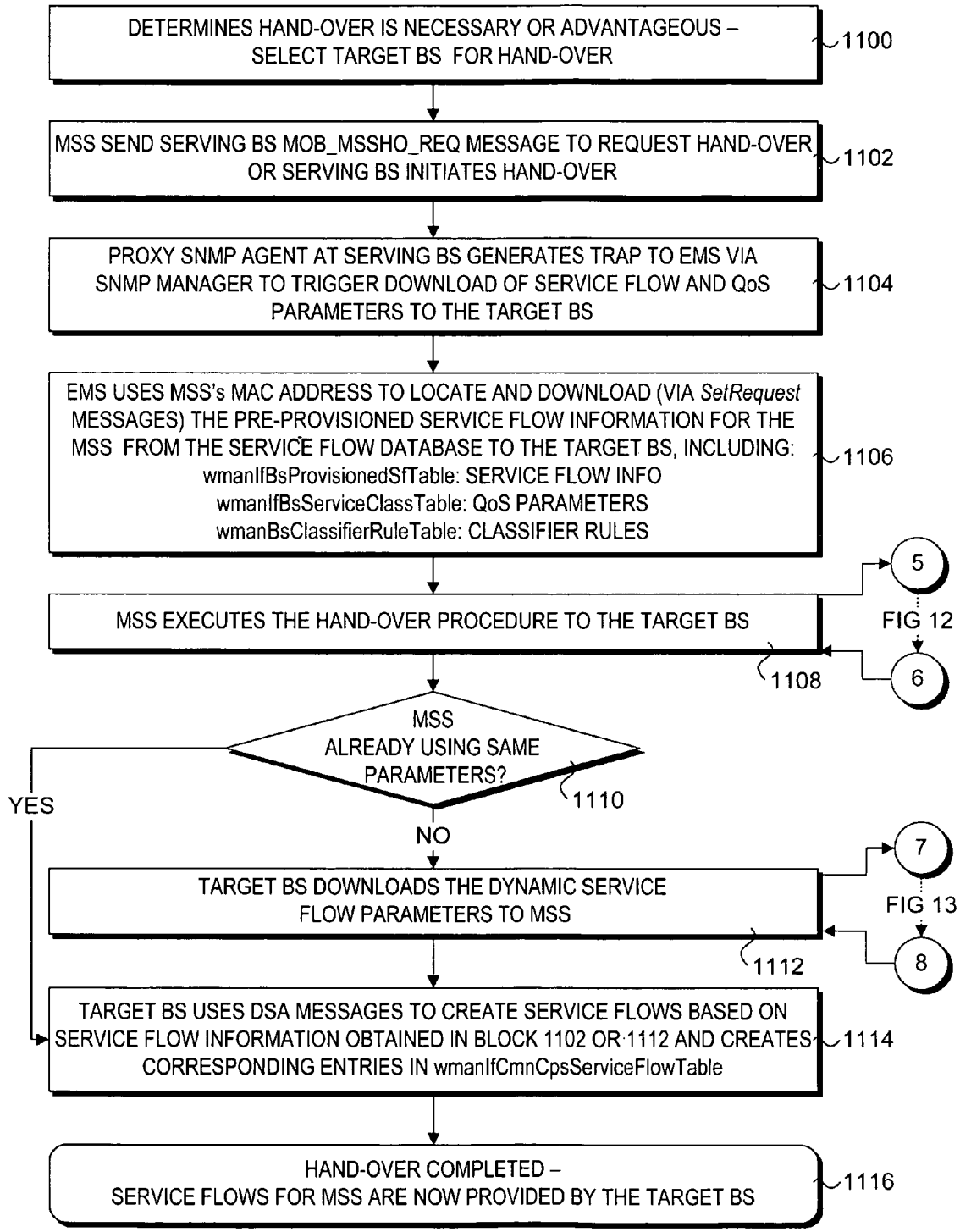
FIG. 11 is a flowchart illustrating operations and logic performed during one embodiment of a hand-over procedure used to migrate the air interface for an MSS from a serving BS to a target BS.

Operations and logic corresponding to one embodiment of a hand-over process are shown in FIG. 11. A hand-over begins with a decision for an MSS to hand-over its air interface, service flow, and network attachment from a serving BS to a target BS. Accordingly, the HO process begins in a block 1100, wherein a determination is made to a need or benefit to migrating an existing service from a serving BS to a new (target) BS. The decision may originate either at the MSS, the serving BS, or the network manager. Typically, the HO decision will be made based on service criteria (e.g., which BS will provide the best air-interface to the MSS) and BS bandwidth availability considerations. In connection with this determination is the ongoing process of cell selection.

Cell selection refers to the process of an MSS scanning and/or ranging one or more BSs in order to determine suitability, along with other performance considerations, for network connection or hand-over. The MSS may incorporate information acquired from a MOB_NBR-ADV (mobile neighbor advertisement) message to give insight into the available neighboring BSs for cell selection consideration. If currently connected to a serving BS, an MSS shall schedule periodic scanning intervals or sleep-intervals to conduct cell selection for the purpose of evaluating MSS interest in hand-over to potential target BSs. This procedure does not involve termination of existing connections to a serving BS and their re-opening in a target BS. If ranging a target BS for hand-over, any newly assigned basic and primary CIDs (connection identifiers) are specific to the target BS and do not replace or supplant the basic and primary CIDs the MSS employs in its communication with its serving BS.

In view of these cell selection operations, an MSS periodically scans neighboring BS to measure radio signal reception strength. As discussed above, a CINR and/or RSSI value is measured using a pre-defined process and message exchange sequence, which is proceeded by the aforementioned MOB_SCN_REQ and MOB_SCN_RSP message exchange to set up a timeframe for performing the scan. As another option, a serving BS may initiate scanning activities by sending a NBR_ADV (Neighbor Advertisement) message to the MSS. The message informs the MSS of a number of local neighbors from which it might obtain better service. In response to the message, the MSS and serving BS exchange MOB_SCN_REQ and MOB_SCN_RSP messages and then the MSS scans the neighbor BSs identified in the MOB-NBR-ADV message. In one embodiment, the determination of block 1100 is made by an MSS in view of the foregoing scanning operations.

In connection with the foregoing hand-over determination, the MSS sends the serving BS an MOB_MSSHO_REQ (mobile MSS hand-over request) message to request a hand-over or the serving BS initiates a hand-over in a block 1102. In response, the proxy SNMP agent at the serving BS generates a trap to EMS 312 (via the SNMP manager 324) to trigger download of service flow and QoS parameters to the target BS in a block 1104. Upon being triggered, EMS 312 uses the MSS's MAC address as a lookup parameter to download the service flow information corresponding to the MSS (entered above in block 802) from service database 314 using SetRequest messages to pre-provision service for the MSS at the target BS. In conjunction with the operations of block 1106, the wmanIfBsProvisionedSfTable is populated with the corresponding service flow information, while corresponding QoS parameters are entered in the wmanIfBsServiceClassTable and corresponding classifier rules are entered in the wmanBsClassifierRuleTable.

Figure 12:
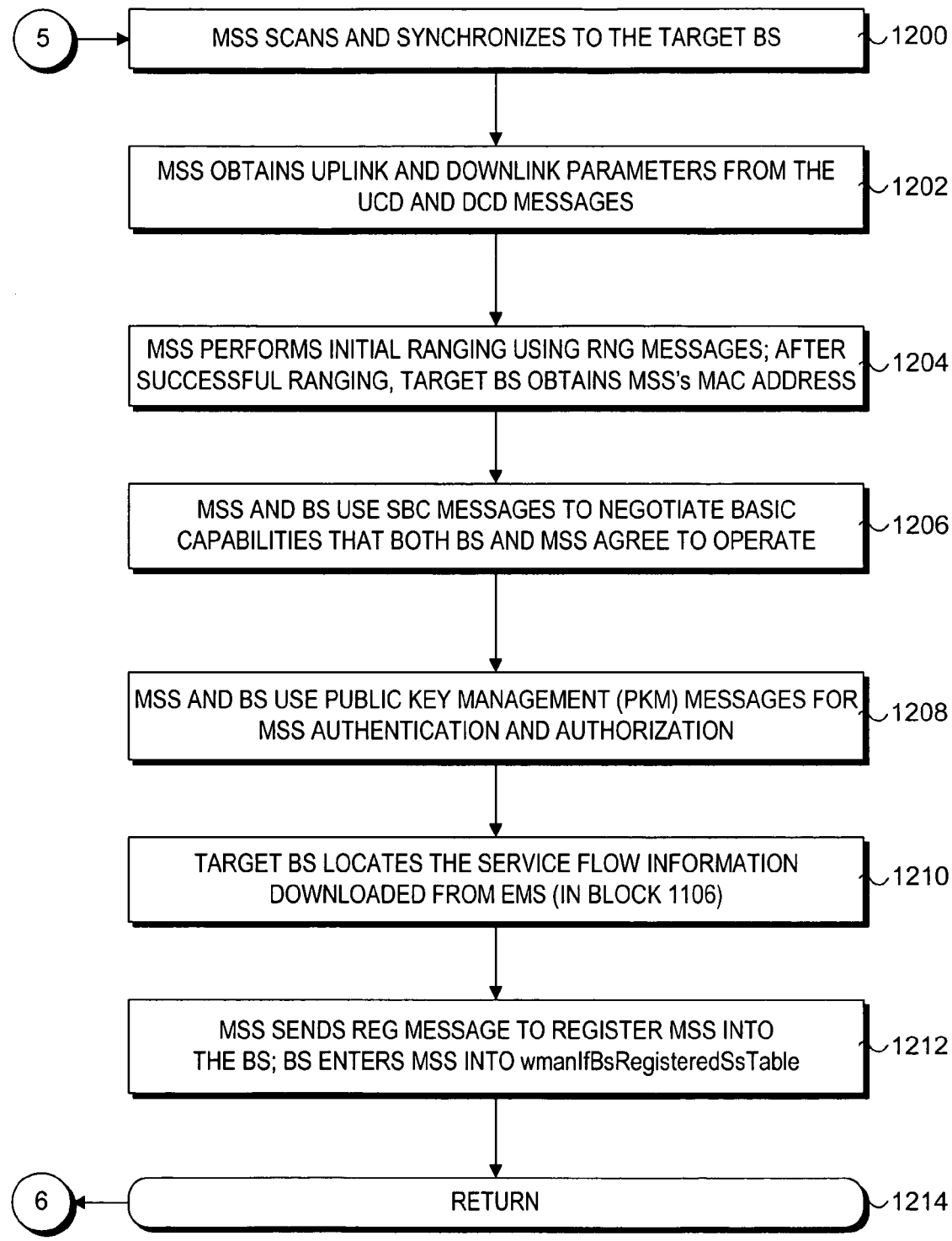
FIG. 12 is a flowchart illustrating details of the hand-over procedure operations of block 1108 in FIG. 11.

At this point, the MSS is ready to perform the hand-over of its air interface from the serving BS to the target BS, the operations of which are generally depicted by a block 1108, while details of one embodiment of this process are shown in FIG. 12. In general, many of the operations are similar to those discussed above with reference to the operations of FIG. 9.

The process begins in a block 1200, wherein the MSS scans and synchronizes with the target BS in a manner similar to that described above for block 900 of FIG. 9. In a block 1202, the MSS then obtains the uplink and downlink parameters via respective UCD and DCD messages in manner similar to that described above for block 902. The MSS then performs initial ranging using RNG messages, and the target BS obtains the MSS's MAC address in a block 1204 in a manner similar to the operation of block 904 described above. The MSS and BS then use SBC messages to negotiate basic capabilities and agree on operating parameters in a block 1206 and us PKM messages for MSS authentication and authorization in block 1208 in a manner similar to that described above for respective blocks 906 and 908.

In a block 1210, the target BS locates the pre-provisioned service flow information that was downloaded from service database 314 above in block 1106. The MSS then sends a REG message to register the MSS into the target BS in a block 1212, and the BS enters the MSS into it's wmanIfBsRegisteredSsTable. The processing of FIG. 12 is then completed in a return block 1214, wherein the logic returns to block 1108.

Upon return, the logic proceeds to a decision block 1110, wherein a determination is made to whether the MSS is already using the same dynamic service flow parameters as those being provisioned by the target BS—in other words, the dynamic service flow parameters for the serving and target BS are the same. In one embodiment, this is identified by using a configuration tag. Under this approach, each configuration file has an associated tag indicating the version of the set of operational parameters and dynamic service flow parameters. In one embodiment, a standard set of configuration files is defined that can be reused across multiple base stations to simply the hand-over procedure. If the answer to decision block 1110 is YES, the logic proceeds directly to a block 1114, skipping a block 1112.

Figure 13:
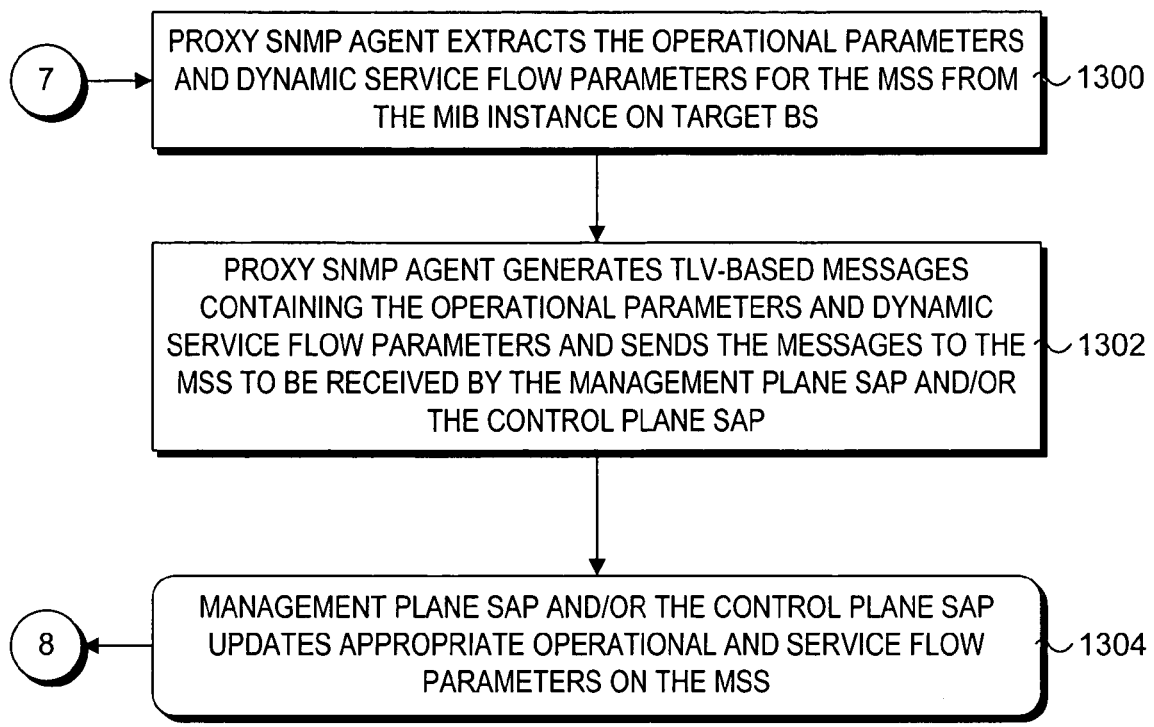
FIG. 13 is a flowchart illustrating details of the dynamic service flow parameter download operation of block 1112 in FIG. 11.

If the answer to decision block 1110 is NO, there is a need to obtain new operational and/or dynamic service flow parameters or the changes from the currently used parameters. Accordingly, the target BS downloads such dynamic service flow parameters in a block 1112. Details of this process are shown in FIG. 13, and are similar to those presented in FIG. 10 to provide dynamic service flow parameters to an MSS entering a broadband wireless network.

The process starts in a block 1300, wherein the proxy SNMP agent extracts the operational parameters and dynamic service flow parameters for the MSS from the MIB instance at the target BS. Optionally, these parameters may be extracted from the SNMP SetRequest message(s) as they are received. In a block 1302, the proxy SNMP agent generates TLV-based messages containing the operational parameters and dynamic service flow parameters and sends the messages to the MSS to be received by the management plane SAP and/or the control plane SAP, as appropriate. The management plane SAP and/or the control plane SAP then update appropriate operational and service flow parameters for the MSS in a return block 1304, which returns the process to block 1112 in FIG. 11.

Continuing at block 1114, the target BS uses DSA messages to create service flows based on service flow information obtained in block 1106 (if the parameters are the same) or 1112 (if the parameters are different) and creates corresponding entries in its smanIfCmnCpsServiceFlowTable. As depicted by an end block 1116, this completes the hand-over process, and thus the service flows for the MSS are now provided by the target BS.

In general, the various operations performed by EMS 312 including SNMP manager 324, proxy SNMP agent 320, management plane SAP 354 and control plane SAP 352 by corresponding software modules and/or applications running on an appropriate host machine. Thus, embodiments of this invention may be used as or to support software executed upon some form of processing core or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A software architecture for a broadband wireless access (BWA) network, comprising:
a network management system (NMS), including a Simple Network Management Protocol (SNMP) manager;
a plurality of proxy SNMP agents, each proxy SNMP agent implemented at a respective base station (BS) in the BWA network, each SNMP proxy agent enabled to communicate with the SNMP manager via SNMP messages encapsulating Management Information Base (MIB) objects and enabled to communicate with a mobile subscriber station (MSS) via a management channel, an SNMP proxy agent further enabled to extract MIB objects encapsulated in SNMP messages received from the SNMP manager and to generate and send messages to an MSS via the management channel containing parameters corresponding to the MIB objects that are extracted; and
a service database, to store service flow and associated quality of service information pertaining to the MSS, wherein the SNMP manager generates the MIB objects in response to the service flow and associated quality of service information to reserve a network resource included in the MSS.

2. The software architecture of claim 1, further comprising:
a management plane service access point (SAP), implemented in an MSS, the management plane SAP supporting communication between management plane entities in the MSS and the proxy SNMP agent via management MAC (media access control) messages sent via the management channel.

3. The software architecture of claim 1, further comprising:
a control plane service access point (SAP), implemented in an MSS, the control plane SAP supporting communication between control and/or data plane components in the MSS and the proxy SNMP agent via control MAC (media access control) messages sent via the management channel.

4. The software architecture of claim 1, further comprising:
a network plane service access point (SAP), to support communication between the network management system and the base stations using an Internet protocol (IP) transport over which SNMP messages may be sent between a proxy SNMP agent and the SNMP manager.

5. The software architecture of claim 1, wherein the network management system comprises:
an element management system (EMS); and
a service database, linked to the EMS, to store service flow data pertaining to subscribers of services provided by an operator of the (BWA) network.

6. The software architecture of claim 1, wherein the proxy SNMP agent is further enabled to maintain an MIB instance containing dynamic service flow information pertaining to MSSs currently being served by the base station on which the proxy SNMP agent is implemented.

7. The software architecture of claim 1, wherein an MSS implements an Institute of Electrical and Electronic Engineers (IEEE) Std. 802.16-based protocol layering reference model including a data/control plane and a management plane, and the proxy SNMP agent is enabled to communicate with each of the data/control plane and the management plane via the management channel using TLV (Type/Length/Value) encoded messages.

8. A machine-readable medium to store a plurality of software modules, including:
a Simple Network Management Protocol (SNMP) manager module, to be implemented in a network management system for a broadband wireless access (BWA) network;
a proxy SNMP agent module, to be implemented at a base station (BS) in the BWA network, the SNMP proxy agent enabled to communicate with the SNMP manager via SNMP messages encapsulating Management Information Base (MIB) objects and enabled to communicate with a mobile subscriber station (MSS) via a management channel, the SNMP proxy agent further enabled to extract MIB objects encapsulated in SNMP messages received from the SNMP manager and to generate and send messages to an MSS via the management channel containing parameters corresponding to the MIB objects that are extracted; and
a service database module, to store service flow and associated quality of service information pertaining to the MSS, wherein the SNMP manager module generates the MIB objects in response to the service flow and associated quality of service information to reserve a network resource included in the MSS.

9. The machine-readable medium of claim 8, wherein the software components further include:
a management plane service access point (SAP) module, to be implemented in an MSS, the management plane SAP module to support communication between management plane entities in the MSS and the proxy SNMP agent module via management MAC (media access control) messages sent via the management channel.

10. The machine-readable medium of claim 8, wherein the software components further include:
a control plane service access point (SAP) module, to be implemented in an MSS, the control plane SAP module to support communication between control/data plane entities in the MSS and the proxy SNMP agent module via control MAC (media access control) messages sent via the management channel.

11. The machine-readable medium of claim 8, wherein the software components further include:
a network plane service access point (SAP) module, to support communication between the network management system and the base stations using an Internet protocol (IP) transport over which SNMP messages may be sent between a proxy SNMP agent module and the SNMP manager module.

12. The machine-readable medium of claim 8, wherein the software components further include:
an element management system (EMS) module, including an interface to a service database, the EMS module to retrieve and store service flow data pertaining to subscribers of services provided by an operator of the (BWA) network from the service database.

13. The machine-readable medium of claim 8, wherein the proxy SNMP agent module is further enabled to maintain an MIB instance containing dynamic service flow information pertaining to MSSs currently being served by the base station on which the proxy SNMP agent module is to be implemented.

14. A method comprising:
enabling a network management system (NMS) for a broadband wireless access (BWA) network to communicate with a mobile subscriber station (MSS) that accesses the BWA network via a serving base station (BS) by,
instantiating an Simple Network Management Protocol (SNMP) manager at the NMS,
instantiating an proxy SNMP agent at the serving BS;
instantiating a service database to store service flow and associated quality of service information pertaining to the MSS;
sending Management Information Base (MIB) objects pertaining to operation of the MSS via SNMP messages in which the MIB objects are encapsulated, wherein the SNMP manager generates the MIB objects encapsulated in the SNMP messages in response to the service flow and associated quality of service information to reserve a network resource included in the MSS; and
sending parameters corresponding to the MIB objects between the proxy SNMP agent and the MSS using a management channel.

15. The method of claim 14, further comprising retrieving parameters from an MSS by performing operations including:
sending an SNMP GetRequest message from the SNMP manager to the proxy SNMP agent, the GetRequest message containing at least one MIB object identifying one or more parameters to be retrieved from the MSS;
extracting said at least one MIB object and the one or more parameters from the SNMP GetRequest message at the proxy SNMP agent;
generating a MAC (media access control) request message identifying the one or more parameters to be retrieved;
sending the MAC request message to the MSS
retrieving the one or more parameters identified by the MAC request message from the MSS;
generating a MAC reply message containing the one or more parameters that are retrieved;
sending the MAC reply message from the MSS to the proxy SNMP agent; generating an SNMP Response message including an MIB object containing the one or more parameters that are retrieved;
sending the SNMP Response message from the SNMP agent to the SNMP manager; and
extracting the parameters from the MIB object contained in the SNMP Response message.

16. The method of claim 15, wherein the one or more parameters that are retrieved relate to parameters employed by a management plane entity of the MSS, and the method further comprises:
generating a management MAC request message identifying the one or more parameters to be retrieved;
sending the management MAC request message to be received by a management plane service access point (SAP) implemented on the MSS;
retrieving the one or more parameters identified by the management MAC request message from at least one management plane entity via the management plane SAP;
generating a management MAC reply message containing the one or more parameters that are retrieved;
sending the management MAC reply message from the management plane SAP to the proxy SNMP agent.

17. The method of claim 15, wherein the one or more parameters that are retrieved relate to parameters employed by a control or data plane component of the MSS, and the method further comprises:
generating a control MAC request message identifying the one or more parameters to be retrieved;
sending the control MAC request message to be received by a control plane service access point (SAP) implemented on the MSS;
retrieving the one or more parameters identified by the control MAC request message from at least one control or data plane component via the control plane SAP;
generating a control MAC reply message containing the one or more parameters that are retrieved; and
sending the control MAC reply message from the control plane SAP to the proxy SNMP agent.

18. The method of claim 14, further comprising:
detecting entry of an MSS into the WBA network;
generating an SNMP trap to the SNMP manager identifying the MSS;
downloading service flow and Quality of Service (QoS) parameters that are pre-provisioned for the MSS from the NMS to the serving BS using one or more SNMP messages;
populating an MIB instance at the serving BS with the service flow and QoS parameters for the MSS; and
sending service flow and QoS parameters to the MSS via the management channel.

19. The method of claim 14, further comprising:
populating base station MIB objects in the MIB instance with base station service flow and QoS parameters corresponding to current service flows provided by the serving BS to the MSS; and
populating subscriber station MIB objects in the MIB instance with subscriber station service flow and QoS parameters employed by the MSS corresponding to the current service flows provided by the serving BS.

20. The method of claim 14, further comprising:
determining that a hand-over of an air-interface for the MSS is to be handed over from the serving BS to a target BS;
sending an SNMP trap from the proxy SNMP agent at the serving BS to the SNMP manager; and in response triggering thereof,
downloading service flow and Quality of Service (QoS) parameters that are pre-provisioned for the MSS from the NMS to a proxy SNMP agent implemented by the target BS using one or more SNMP messages;

populating an MIB instance at the target BS with the service flow and QoS parameters for the MSS; and handing over the air-interface for the MSS to the target BS using the service flow and QoS parameters that are downloaded from the NMS.

\* \* \* \* \*